US00RE48686E

(19) United States
(12) Reissued Patent
Otsuka et al.

(10) Patent Number: US RE48,686 E
(45) Date of Reissued Patent: Aug. 17, 2021

(54) INK-JET PRINTER

(71) Applicant: RISO KAGAKU CORPORATION, Tokyo (JP)

(72) Inventors: Shinichiro Otsuka, Ibaraki (JP); Hirohito Kubota, Ibaraki (JP)

(73) Assignee: RISO KAGAKU CORPORATION, Tokyo (JP)

(21) Appl. No.: 16/293,352

(22) Filed: Mar. 5, 2019

Related U.S. Patent Documents

Reissue of:
(64) Patent No.: 9,586,412
Issued: Mar. 7, 2017
Appl. No.: 15/040,325
Filed: Feb. 10, 2016

(30) Foreign Application Priority Data

Feb. 25, 2015 (JP) ..... 2015-035087

(51) Int. Cl.
*B41J 2/045* (2006.01)
*B41J 2/18* (2006.01)
(Continued)

(52) U.S. Cl.
CPC ..... *B41J 2/04515* (2013.01); *B41J 2/175* (2013.01); *B41J 2/1714* (2013.01); *B41J 2/18* (2013.01);
(Continued)

(58) Field of Classification Search
CPC . B41J 2/1714; B41J 2/175; B41J 2/245; B41J 29/377; B41J 2/28; B41J 2/04515;
(Continued)

(56) References Cited

U.S. PATENT DOCUMENTS 6,390,618 B1 * 5/2002 Wotton ..... B41J 11/002 347/102
8,308,284 B2 * 11/2012 Kanada ..... B41J 2/175 347/102
(Continued)

FOREIGN PATENT DOCUMENTS

JP 2-179761 7/1990
JP 2004-284058 10/2004
(Continued)

OTHER PUBLICATIONS

Office Action in corresponding Japanese Patent Application No. JP2015-035087 dated Sep. 4, 2018.

*Primary Examiner* — Minh Nguyen
(74) *Attorney, Agent, or Firm* — Greenblum & Bernstein, P.L.C.

(57) ABSTRACT

A head holder has an opening through which a space between the head holder and a conveyer communicates with an inside of the head holder. Ahead cooler includes a blower configured to blow air into the head holder from an outside of the head holder with a flow rate of blow air and a suction unit configured to suction air from the head holder with a flow rate of suction air. The head cooler generates cooling air for cooling an ink-jet head inside the head holder by the blower and the suction unit. A controller controls the flow rate of blow air and the flow rate of suction air such that air containing ink mist is suctioned into the head holder through the opening.

18 Claims, 12 Drawing Sheets

(51) Int. Cl.

| | |
|---|---|
| ***B41J 29/38*** | (2006.01) |
| ***B41J 2/17*** | (2006.01) |
| ***B41J 29/377*** | (2006.01) |
| ***B41J 2/175*** | (2006.01) |
| ***B41J 2/245*** | (2006.01) |
| ***B41J 2/185*** | (2006.01) |

(52) U.S. Cl.
CPC ..... *B41J 2/245* (2013.01); *B41J 29/377* (2013.01); *B41J 29/38* (2013.01); *B41J 2002/1853* (2013.01); *B41J 2202/12* (2013.01)

(58) Field of Classification Search
CPC . B41J 29/38; B41J 2002/1853; B41J 2202/02
See application file for complete search history.

(56) References Cited

U.S. PATENT DOCUMENTS

| | | | | |
|---|---|---|---|---|
| 9,050,812 | B2 | 6/2015 | Tanaka | |
| 2012/0001985 | A1* | 1/2012 | Kumagai | B41J 2/1714 347/34 |
| 2012/0281041 | A1 | 11/2012 | Leoni et al. | |
| 2014/0225959 | A1* | 8/2014 | Kobayashi | B41J 2/19 347/34 |

FOREIGN PATENT DOCUMENTS

| | | | | |
|---|---|---|---|---|
| JP | 2005-271314 | A * | 10/2005 | B41J 2/18 |
| JP | 2010-264752 | | 11/2010 | |
| JP | 2012-187862 | | 10/2012 | |
| JP | 2013-237172 | | 11/2013 | |
| JP | 2014-195886 | | 10/2014 | |
| JP | 2015-016623 | | 1/2015 | |

* cited by examiner

Amended
FIG. 9B
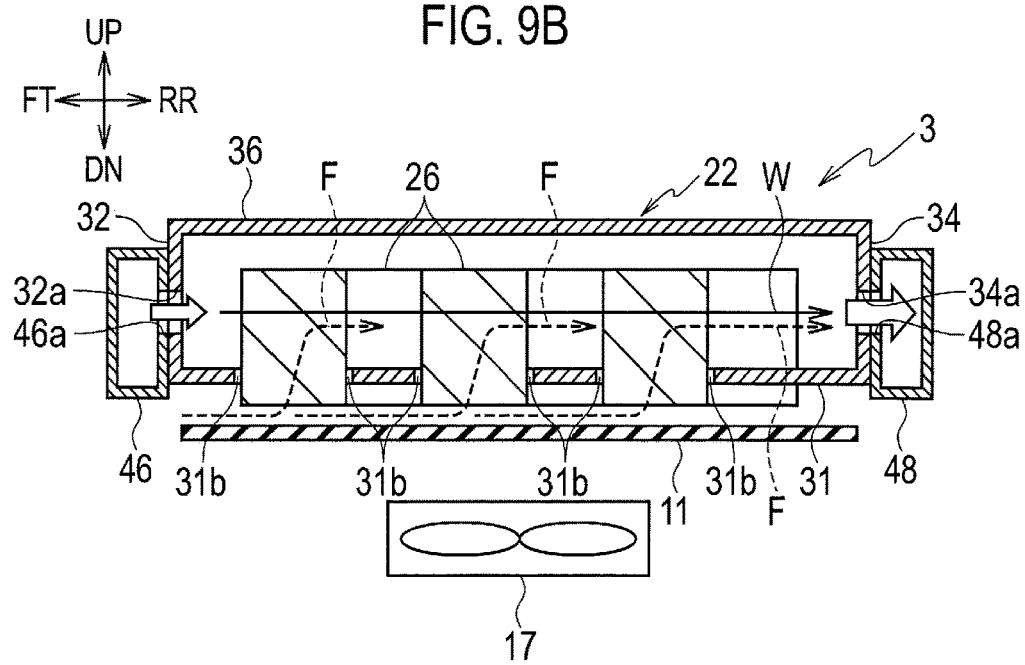
Amended

FIG. 10

| | | NEGATIVE-PRESSURE TANK INK LEVEL SENSOR | |
|---|---|---|---|
| | | ON | OFF |
| POSITIVE-PRESSURE TANK INK LEVEL SENSOR | ON | INK PUMP: OFF<br>INK SUPPLY VALVE: CLOSED | INK PUMP: OFF<br>INK SUPPLY VALVE: CLOSED |
| | OFF | INK PUMP: ON<br>INK SUPPLY VALVE: CLOSED | INK PUMP: OFF<br>INK SUPPLY VALVE: OPEN |

INK-JET PRINTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is an application for reissue of U.S. Pat. No. 9,586,412, which matured from U.S. application Ser. No. 15/040,325, which* is based upon and claims the benefit of priority from the prior Japanese Patent Application No. 2015-035087, filed on Feb. 25, 2015, the entire contents of which are incorporated herein by reference.

BACKGROUND

1. Technical Field

The present disclosure relates to an ink-jet printer configured to perform printing by ejecting ink from an inkjet head.

2. Related Art

In an ink-jet printer, ink mist is generated by ink ejection from an ink-jet head. The ink mist causes contamination inside the printer. Also, the ink mist may deteriorate print image quality by adhering to paper to be printed.

To counter this problem, Japanese Patent Application Publication No. 2004-284058 discloses an ink-jet printer including a mist collector. The mist collector in the ink-jet printer sets a collection duct at a negative pressure by a sirocco fan, and collects ink mist by suctioning air containing the ink mist through an opening of the collection duct.

SUMMARY

However, the inkjet printer disclosed in Japanese Patent Application Publication No. 2004-284058 is increased in size since the dedicated mist collector is provided to collect the ink mist.

It is an object of the present disclosure to provide an ink-jet printer capable of reducing contamination inside the printer and deterioration in print image quality due to ink mist while an increase in size of the printer is suppressed.

An ink-jet printer in accordance with some embodiments includes: a conveyer configured to convey a printing medium; an ink-jet head configured to eject ink onto the printing medium conveyed by the conveyer; a head holder in a box shape configured to hold the ink-jet head, the head holder having an opening through which a space between the head holder and the conveyer communicates with an inside of the head holder; a head cooler including a blower configured to blow air into the head holder from an outside of the head holder with a flow rate of blow air and a suction unit configured to suction air from the head holder with a flow rate of suction air, the head cooler configured to generate cooling air for cooling the ink-jet head inside the head holder by the blower and the suction unit; and a controller configured to drive the conveyer to convey the printing medium while driving the ink-jet head to eject the ink onto the printing medium to perform printing and driving the head cooler to generate die cooling air. The controller is configured to control the flow rate of blow air and the flow rate of suction air such that air containing ink mist is suctioned into the head holder through the opening.

According to the above configuration, the controller controls the blow air flow rate of the blower and the suction air flow rate of the suction unit such that the air containing ink mist can be suctioned into the head holder through the opening. Thus, the ink mist can be collected into the head holder. As a result, contamination inside the printer and deterioration in print image quality due to the ink mist can be reduced. Moreover, the ink mist is collected into the head holder by controlling the blow air flow rate of the blower and the suction air flow rate of the suction unit in the head cooler. Hence, there is no need to add a dedicated mechanism to collect the ink mist. Thus, an increase in size of the printer can be suppressed. Therefore, contamination inside the printer and deterioration in print image quality due to the ink mist can be reduced while an increase in size of the printer can be suppressed.

The controller may selectively use a first mode and a second mode. In the first mode, the controller may control the flow rate of blow air and the flow rate of suction air such that the cooling air in the head holder has an air volume required to cool the ink-jet head corresponding to a conveyance speed of the printing medium by the conveyer. In the second mode, the controller may control the flow rate of blow air and the flow rate of suction air such that the cooling air in the head holder has an air volume being smaller than the air volume of the cooling air in the head holder in the first mode and airflow flowing into the head holder through the opening has an air volume being smaller than an air volume of airflow flowing into the head holder through the opening in the first mode and capable of suctioning the ink mist.

According to the above configuration, the controller selectively uses the first mode capable of printing without reducing print productivity by ensuring cooling performance of the ink-jet head and the second mode capable of obtaining better print image quality than the first mode. Thus, convenience is improved since the printer can deal with the case where a user puts priority on the print productivity and the case where the user puts priority on the print image quality.

In the second mode, the controller may drive the conveyer to reduce the conveyance speed of the printing medium upon a temperature of the ink-jet head reaching a threshold.

According to the above configuration, an increase in temperature of the ink-jet head can be suppressed to reduce damage to the ink-jet head.

The ink-jet printer may further include an ink circulator configured to supply the ink to the ink-jet head while circulating the ink. The controller may drive the ink circulator such that an ink circulation flow rate in the second mode is higher than an ink circulation flow rate in the first mode.

According to the above configuration, an increase in temperature of the ink-jet head can be reduced in the second mode by increasing the ink circulation flow rate compared with the first mode. Thus, even in the second mode having a smaller flow rate of cooling air than the first mode, the damage to the ink-jet head can be reduced without a drop in print productivity.

The ink-jet printer may further include an ink circulator configured to supply the ink to the ink-jet head while circulating the ink. The ink circulator may include an ink cooler configured to cool the ink. In the first mode, the controller may drive the ink cooler to start cooling of the ink upon an ink temperature of the ink being a first temperature. In the second mode, the controller may drive the ink cooler to start cooling of the ink upon an ink temperature of the ink being second temperature lower than the first temperature.

According to the above configuration, in the second mode than, the ink temperature low to start cooling of the ink by the ink cooler is set lower than in the first mode, and thereby an increase in the temperature of the inkjet head can be reduced. Thus, even in the second mode having a smaller flow rate of the cooling air than the first mode, the damage to the ink-jet head can be reduced without a drop in print productivity.

BRIEF DESCRIPTION OF THE DRAWINGS

FIG. 9B is a diagram showing an airflow inside the head holder as seen from [front] *right*.

FIG. 10 is an explanatory diagram of ink level maintenance control.

DETAILED DESCRIPTION

Figure 1:
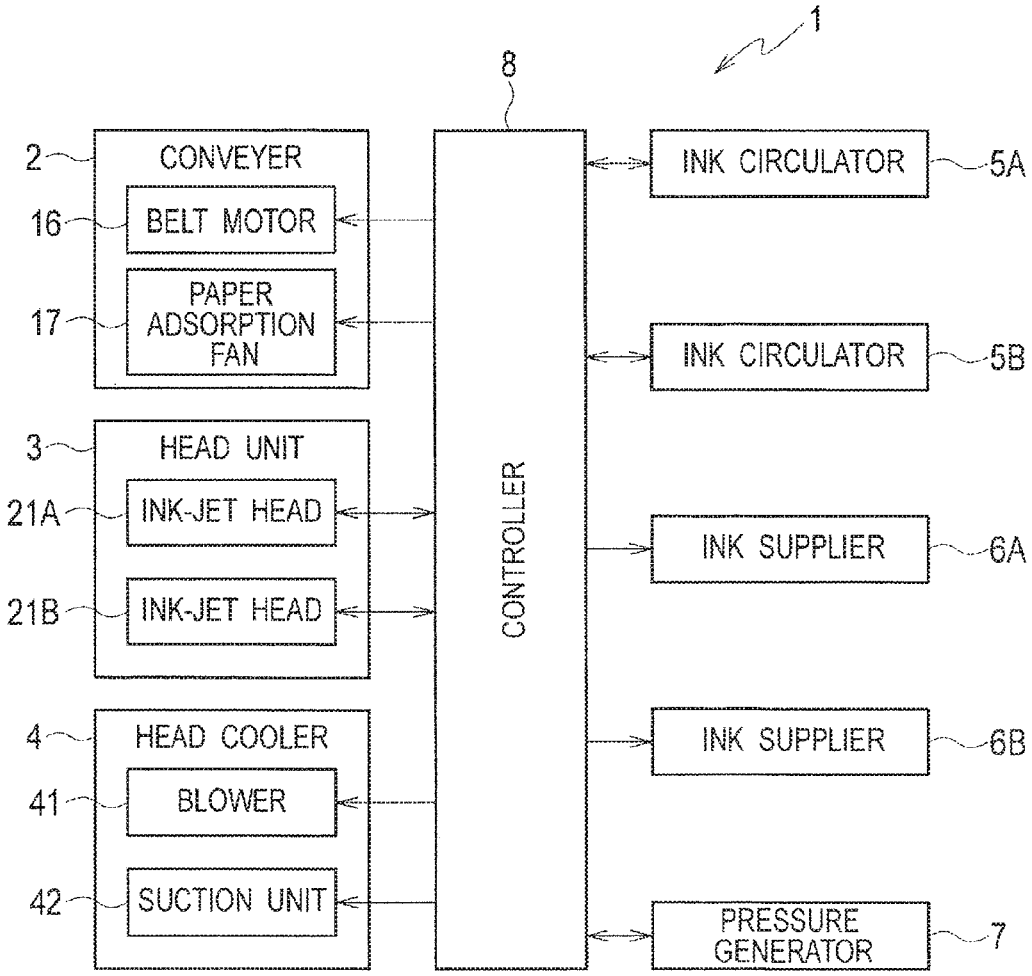
FIG. 1 is a block diagram showing a configuration of an ink-jet printer according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

Figure 2:
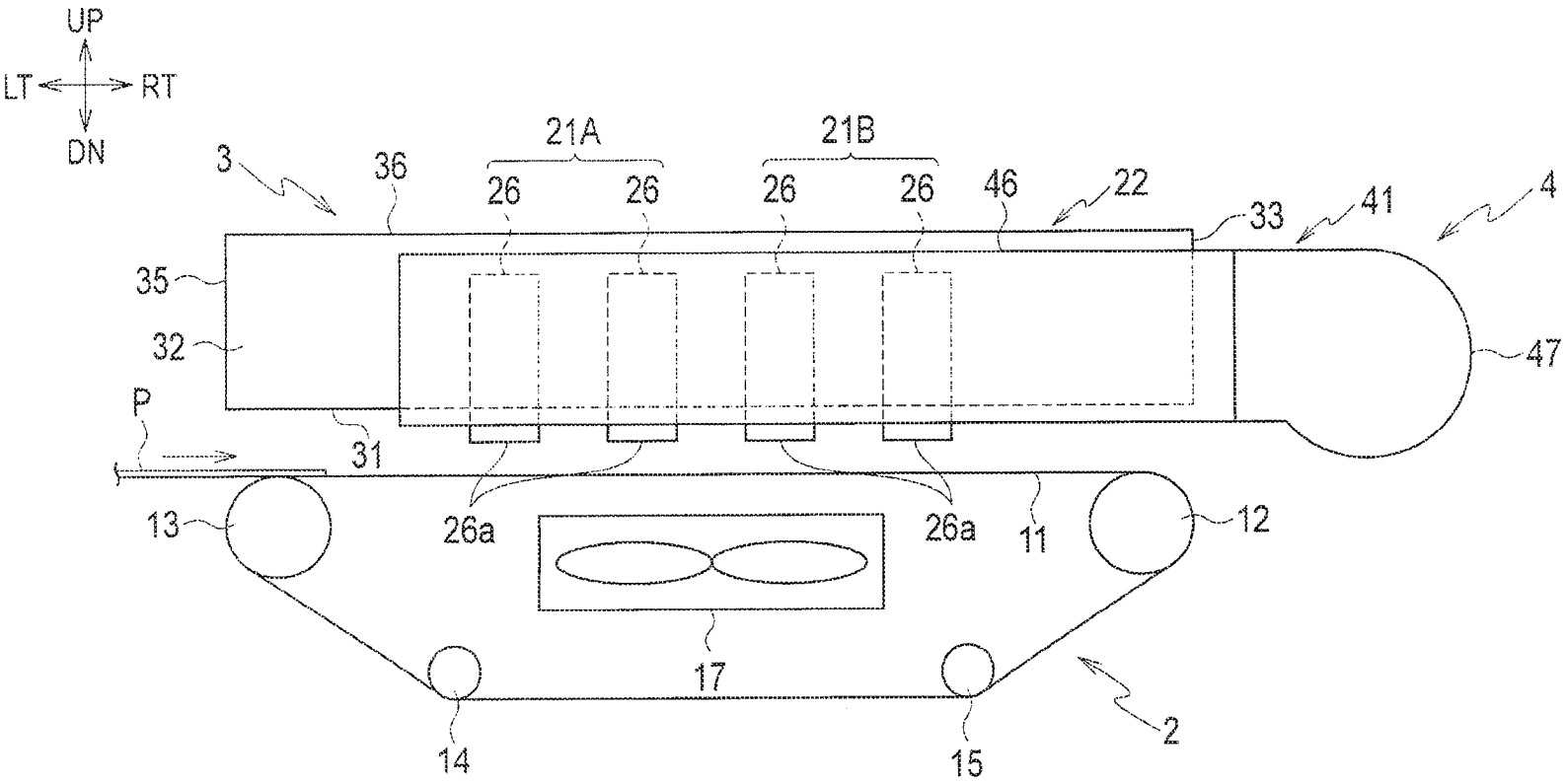
FIG. 2 is a schematic configuration diagram of a conveyer, a head unit and a head cooler in the ink-jet printer shown in FIG. 1.
Figure 3:
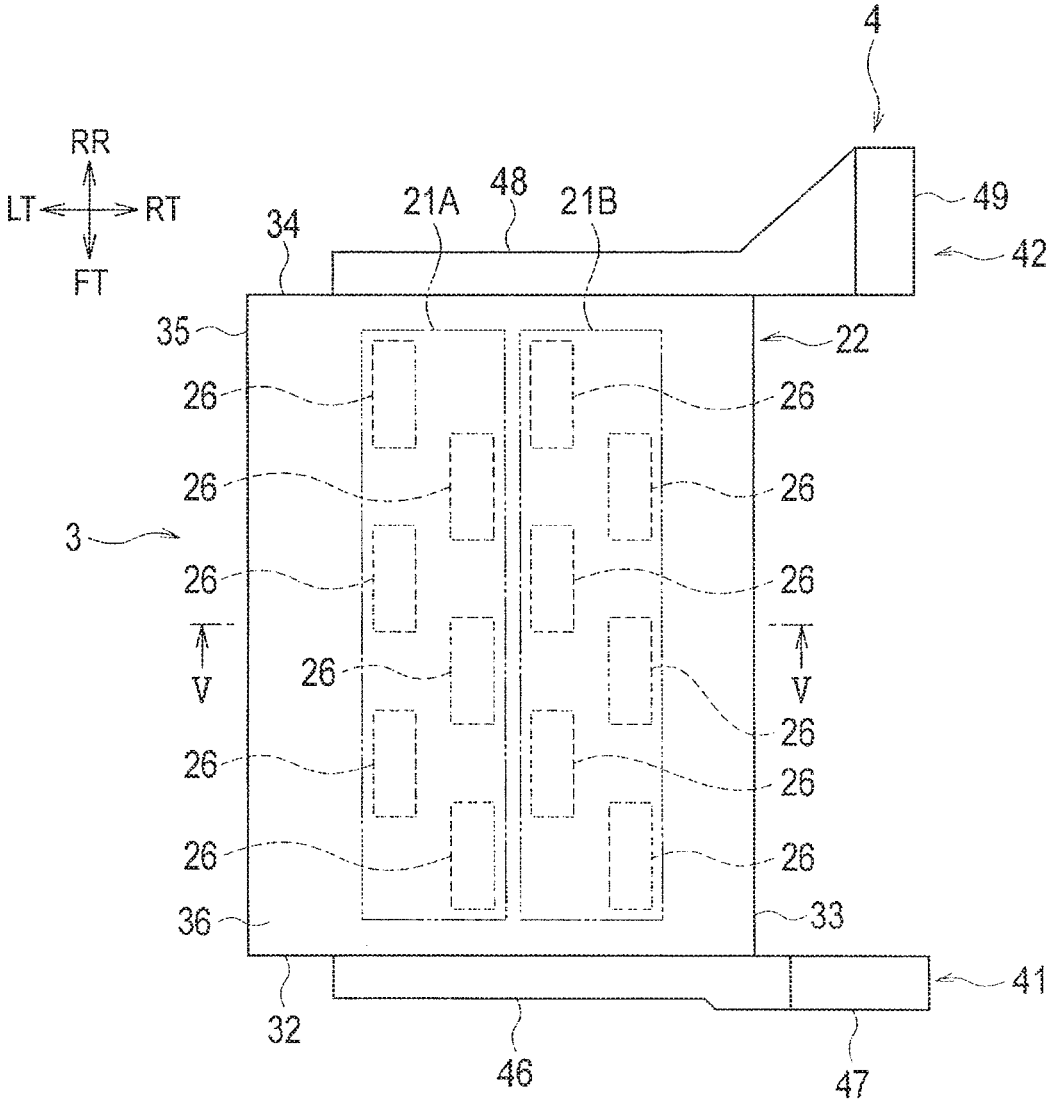
FIG. 3 is a plan view of the bead unit and the head cooler in the ink-jet printer shown in FIG. 1.
Figure 4:
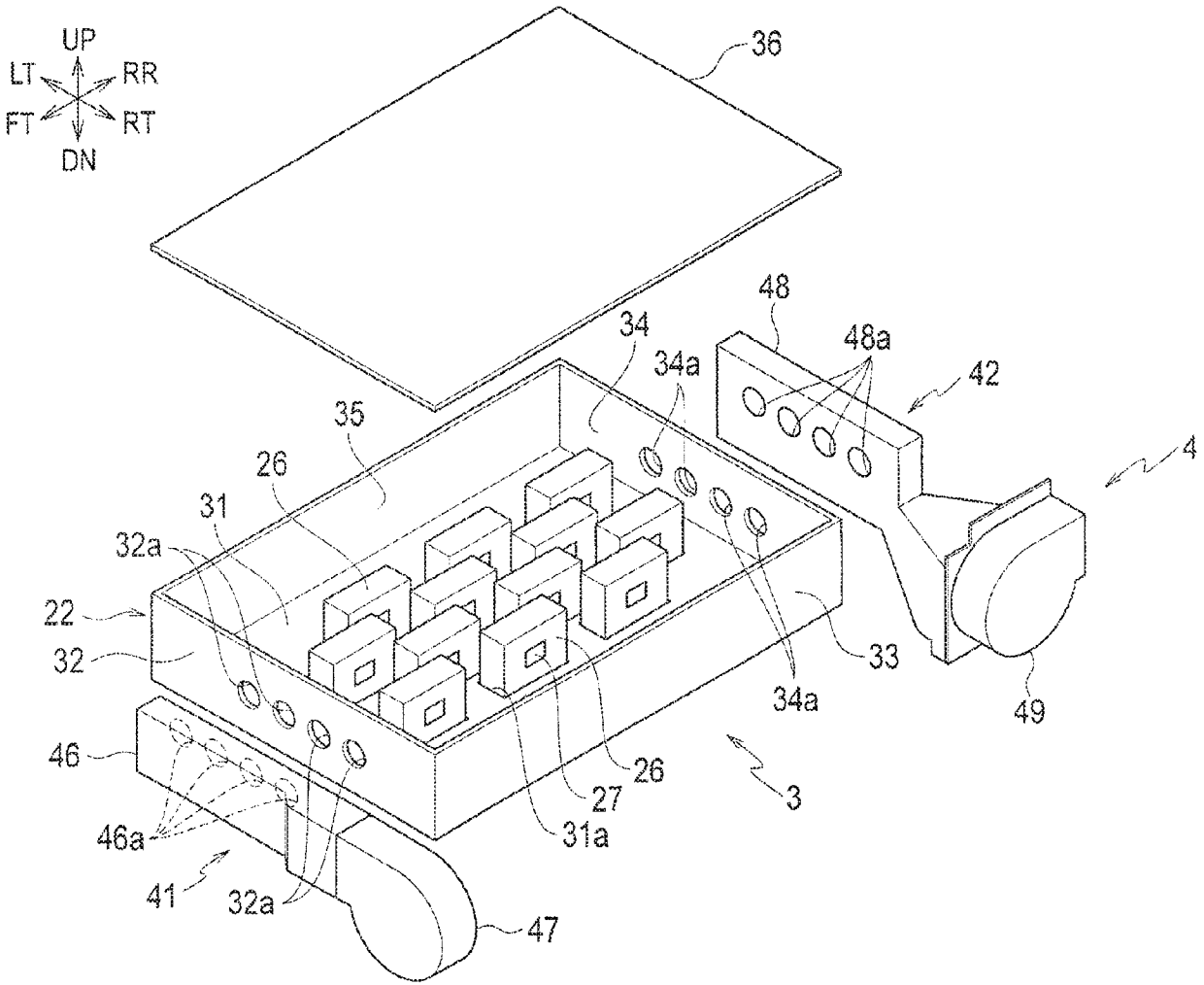
FIG. 4 is an exploded perspective view of the head unit and the head cooler in the ink-jet printer shown in FIG. 1.
Figure 5:
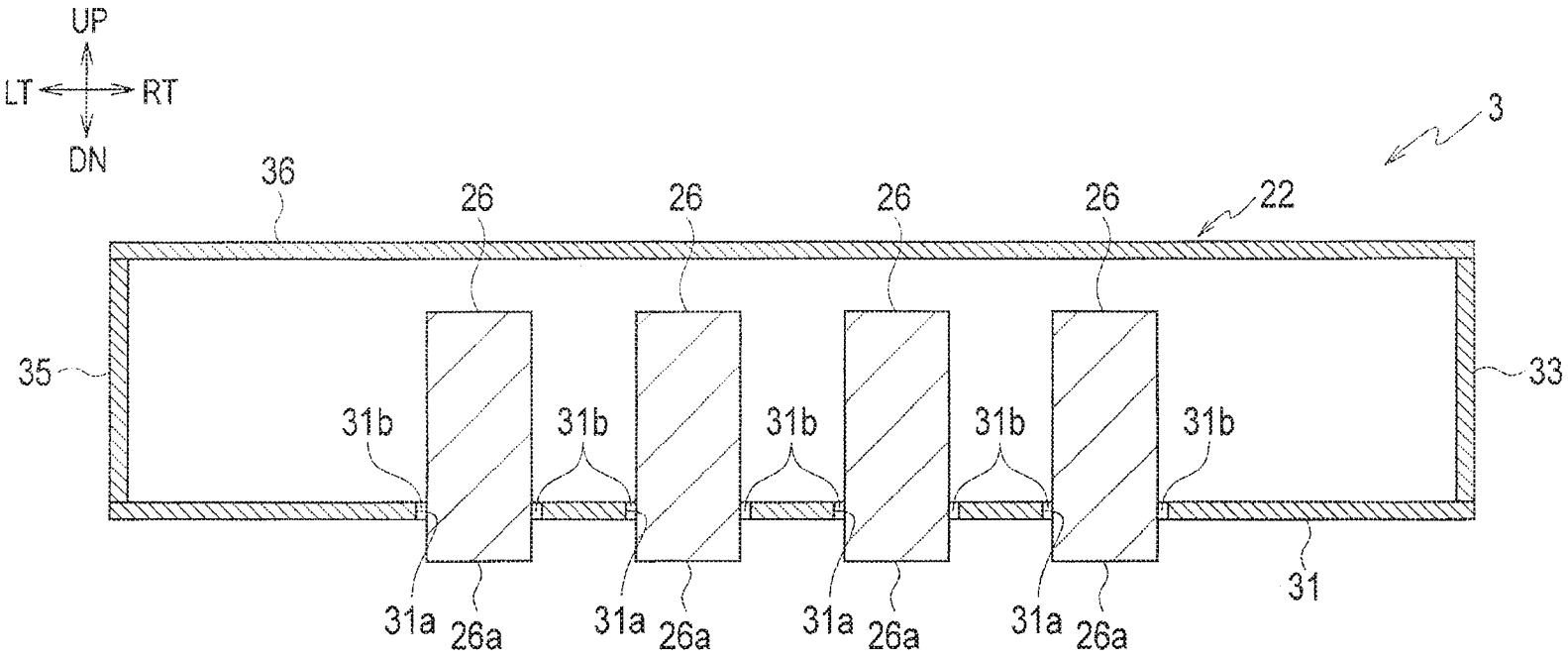
FIG. 5 is a cross-sectional view taken along the line V-V in FIG. 3.
Figure 6:
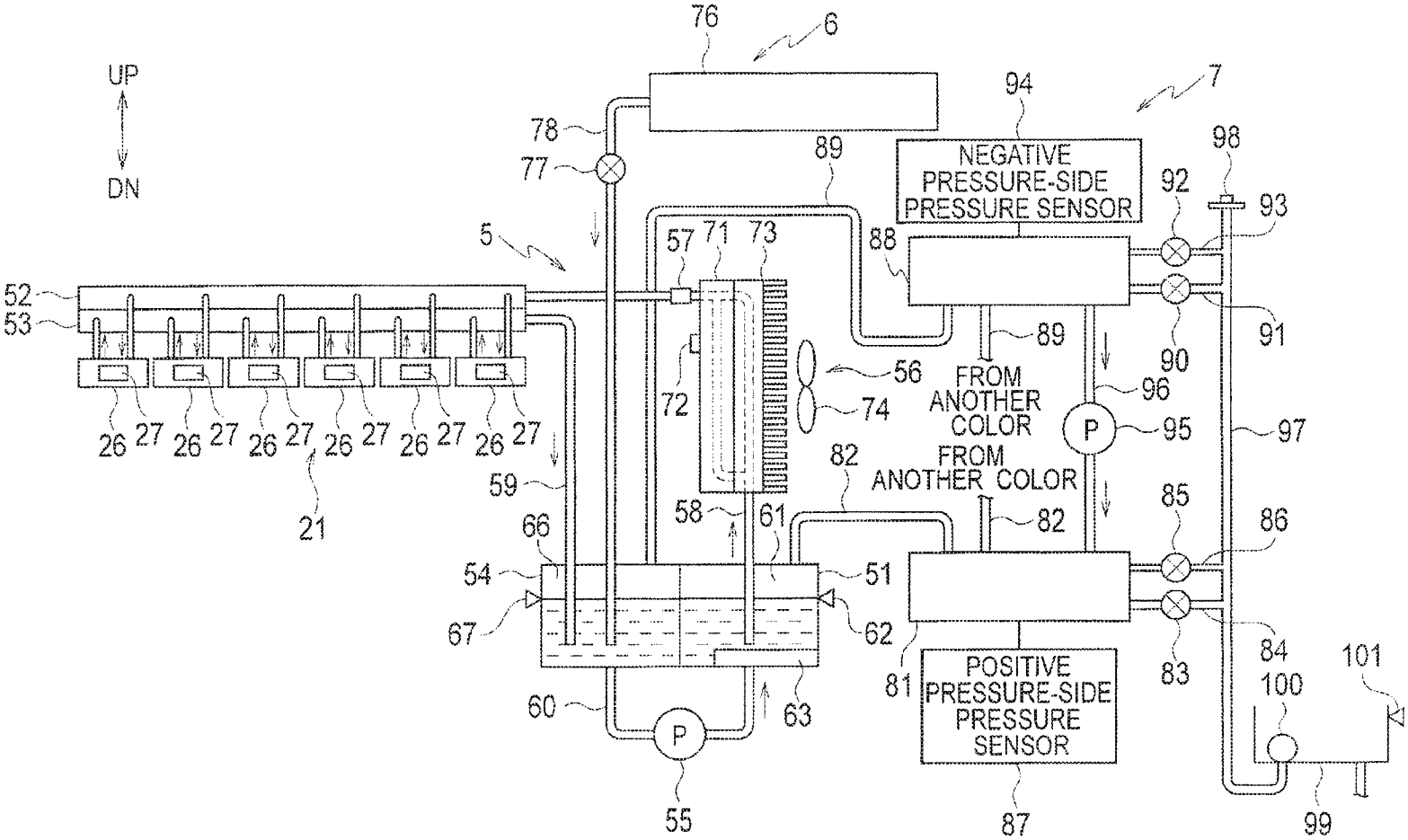
FIG. 6 is a schematic configuration diagram of an ink circulator, an ink supplier and a pressure generator in the ink-jet printer shown in FIG. 1.

FIG. 1 is a block diagram showing a configuration of an ink-jet printer according to a first embodiment of the present invention. FIG. 2 is a schematic configuration diagram at a conveyer, a head unit and a head cooler in the ink-jet printer shown in FIG. 1. FIG. 3 is a plan view of the head unit and the head cooler. FIG. 4 is an exploded perspective view of the head unit and the head cooler. FIG. 5 is a cross-sectional view taken along the line V-V in FIG. 1. FIG. 6 is a schematic configuration diagram of an ink circulator, an ink supplier and a pressure generator in the ink-jet printer shown in FIG. 1.

In the following description, it is assumed that a direction perpendicular to the page surface in FIG. 2 is a longitudinal direction and a page surface front direction is the front. In FIGS. 2 to 6, 9A and 9B, the right direction, left, direction, up direction, down direction, front direction and rear direction are denoted by RT, LT, UP, DN, FT and RR, respectively. The direction from left to right is the conveyance direction of paper P that is a printing medium.

As shown in FIG. 1, an ink-jet printer 1 according to the first embodiment includes a conveyer 2, a head unit 3, a head cooler 4, ink circulators 5A and 5B, ink suppliers 6A and 6B, a pressure generator 7 and a controller 8. Note that the alphabetical letters (A and B) in reference numerals of the ink circulators 5A and 5B and the ink suppliers 6A and 6B may be omitted for collective notation.

The conveyer 2 conveys the paper P. As shown in FIGS. 1 and 2, the conveyer 2 includes a conveyer belt 11, a drive roller 12, driven rollers 13, 14 and 15, a belt motor 16 and a paper adsorption fan 17.

The conveyer belt 11 conveys the paper P while holding the paper by adsorption. The conveyer belt 11 is a looped belt wound around the drive roller 12 and the driven rollers 13 to 15. The conveyer belt 11 has a number at belt holes (not shown) formed therein. The conveyer belt 11 holds the paper P by adsorption force generated in the belt holes by driving the paper adsorption fan 17. The conveyer belt 11 conveys the paper P, which is held by adsorption, rightward by rotating in a clockwise direction in FIG. 2.

The drive roller 12 rotates the conveyer belt 11 in the clockwise direction in FIG. 2.

The driven rollers 13 to 15 support the conveyer belt 11 together with the drive roller 12. The driven rollers 13 to 15 follow the drive roller 12 through the conveyer belt 11. The driven roller 13 is arranged to the left of the drive roller 12 at the same height as the drive roller 12. The driven rollers 14 and 15 are arranged at the same height at a distance from each other in a horizontal direction below the drive roller 12 and the driven roller 13.

The belt motor 16 rotationally drives the drive roller 12.

The paper adsorption fan 17 generates downward airflows. Thus, the paper adsorption fan 17 generates a negative pressure in the belt holes by suctioning air through the belt holes in the conveyer belt 11, thereby adsorbing the paper P on the conveyer belt 11. The paper adsorption fan 17 is arranged in a region surrounded by the looped conveyer belt 11.

The head unit 3 prints an image by ejecting ink onto the paper P conveyed by the conveyer 2. The head unit 3 includes ink-jet heads 21A and 21B and a head holder 22. Note that the alphabetical letters (A and B) in reference numerals of the ink-jet heads 21A and 21B may be omitted for collective notation.

The ink-jet heads 21A and 21B elect ink onto the paper P. The ink-jet heads 21A and 21B elect different colors of ink. The ink-jet heads 21A and 21B are arranged in parallel to each other along the conveyance direction (horizontal direction) of the paper P. Each of the ink jet heads 21A and 21B has six head modules 26.

The head modules 26 are arranged in a zigzag pattern as shown in FIGS. 3 and 4. More specifically, in the ink-jet head 21. two head module arrays, each including three head modules 26 arranged to be equally spaced apart along the longitudinal direction, are arranged to be shifted from each other by a half pitch in the longitudinal direction.

Each of the head modules 26 has an ink ejection surface 26a. The ink ejection surface 26a is a lower surface of the head module 26 facing the conveyer belt 11. The ink election surface 26a has a number of nozzles (not shown) provided therein, which are arranged along the longitudinal direction (main scanning direction). The head module 26 ejects ink, which is supplied from the ink circulator 5, through the nozzles.

Each of the head modules 26 is provided with a head temperature sensor 27. The head temperature sensor 27 measures the temperature of the head module 26.

The head holder 22 holds the ink-jet heads 21A and 21B. The head holder 22 is formed in a box shape having a hollow rectangular parallelepiped shape. As shown in FIGS. 4 and 5, the head holder 22 has a bottom plate 31, side plates 32 to 35 and a top plate 36.

The bottom plate 31 holds and fixes the head modules 26 in the ink-jet heads 21A and 21B. The bottom plate 31 is formed in a rectangular shape. As shown in FIG. 5, the bottom plate 31 has attachment openings 31a formed therein. The same number of the attachment openings 31a as that of the head modules 26 are formed.

Each of the head modules 26 is inserted into one of the attachment openings 31a and fixed therein such that the ink ejection surface 26a protrudes downward from the lower surface of the bottom plate 31. The attachment opening 31a is a through-hole larger than the cross-section or the head module 26 along the horizontal plane. Thus, the attachment position and angle of the head module 26 can be adjusted. Since the attachment openings 31a are thus formed, the head modules 26 are attached to the attachment openings 31a through gaps (openings) 31b. A space between the bottom plate 31 of the head holder 2 and the conveyer belt 11 in the conveyer 2 is communicated with the inside of the head holder 22 by the gaps 31b.

The side plates 32, 33, 34 and 35 form front, right, rear and left sidewalls of the head holder 22, respectively. The side plates 32 to 35 are integrally formed and provided upright around the bottom plate 31.

The front side plate 32 has four vent holes 32a formed therein. The vent holes 32a are inlets of air when the air is blown into the head holder 22 by a blower 41 to be described later. The four vent holes 32a are formed on extension lines of the four head module arrays including the head modules 26 in the ink-jet heads 21A and 21B, one vent hole 32a for each array.

The rear side plate 34 has four vent holes 34a formed therein. The vent holes 34a are outlets of air when the air is suctioned from the head holder 22 by a suction unit 42 to be described later. The four vent holes 34a are arranged at positions opposite to the respective four vent holes 32a in the front side plates 32. In other words, the four vent holes 34a are formed on extension lines of the four head module arrays including the head modules 26 in the ink-jet heads 21A and 21B, one vent hole 34a for each array.

The top plate 36 is a cover that closes an upper opening of the sidewall formed of the side plates 32 to 35. The top plate 36 is formed in a rectangular shape.

The head cooler 4 cools the ink-jet head 21 by generating cooling air in the head holder 22. The head cooler 4 includes the blower 41 and the suction unit 42.

The blower 41 blows air into the head holder 22 from outside. The blower 41 is arranged at the front of the head holder 22. The blower 41 includes a blowing chamber 46 and a blowing fan 47.

The blowing chamber 46 forms an airflow path between the blowing fan 47 and the head holder 22. The blowing chamber 46 is formed in a hollow shape that is elongated in the right-left direction. The blowing chamber 46 is arranged on the front side plate 32 of the head holder 22. In a surface of the blowing chamber 46 that comes into contact with the side plate 32, four blowing holes 46a are formed.

The blowing holes 46a are outlets of air from the blowing chamber 46 when the air is blown into the head holder 22. The blowing holes 46a are arranged at positions corresponding to the vent holes 32a in the side plate 32. In other words, the four blowing holes 46a are formed on extension lines of the four head module arrays including the head modules 26 in the ink-jet heads 21A and 21B, one blowing hole 46a for each array.

The blowing fan 47 sends air into the blowing chamber 46 from one end of the blowing chamber 46. Thus, air is blown into the head holder 22 through the blowing holes 46a in the blowing chamber 46.

The suction unit 42 suctions air from the head holder 22. The suction unit 42 is arranged at the rear of the head holder 22. The suction unit 42 includes a suction chamber 48 and a suction fan 49.

The suction chamber 48 forms an airflow path between the head holder 22 and the suction fan 49. The suction chamber 48 is formed in a hollow shape that is elongated in the right-left direction. The suction chamber 48 is arranged on the rear side plate 34 of the head holder 22. In a surface of the suction chamber 48 that comes into contact with the side plate 34, four suction holes 48a are formed.

The suction holes 48a are inlets of air into the suction chamber 48 when the air is suctioned from the head holder 22. The suction holes 48a are arranged at positions corresponding to the vent holes 34a in the side plate 34. In other words, the four suction holes 48a are formed on extension lines of the four head module arrays including the head modules 26 in the ink-jet heads 21A and 21B, one suction hole 48a for each array.

The suction fan 49 suctions air from one end of the suction chamber 48. Thus, air is suctioned from the head holder 22 through the suction holes 48a in the suction chamber 48 and the vent holes 34a in the side plate 34.

The ink circulator 5 supplies ink to the ink-jet head 21 while circulating the ink. The ink circulators 5A and 5B supply ink to the ink-jet heads 21A and 21B, respectively. As shown in FIG. 6, the ink circulator 5 includes a positive-pressure tank 51, an ink distributor 52, a collector 53, a negative-pressure tank 54, an ink pump 55, an ink temperature regulator 56, an ink temperature sensor 57 and ink circulation pipes 58 to 60.

The positive-pressure tank 51 stores ink to be supplied to the ink-jet head 21. The ink in the positive-pressure tank 51 is supplied to the ink-jet head 21 through the ink circulation pipe 58 and the ink distributor 52. Inside the positive-pressure tank 51, an air layer 61 is formed on the ink surface. The positive-pressure tank 51 is connected to a positive-pressure common air chamber 81 to he described later through a positive pressure-side communicating pipe 82 to be described later. The positive-pressure tank 51 is arranged at a position lower than the ink-jet head 21.

The positive-pressure tank 51 is provided with a positive-pressure ink level sensor 62 and an ink filter 63.

The positive-pressure ink level sensor 62 is configured to detect whether or not the ink level in the positive-pressure tank 51 has reached a reference level. The positive-pressure ink level sensor 62 outputs a signal indicating "on" when the ink level in the positive-pressure tank 51 is not less than the reference level, and outputs a signal indicating "off" when the ink level is less than the reference level.

The ink filter 63 removes unwanted material and the like in the ink.

The ink distributor 52 distributes the ink, which is supplied from the positive-pressure tank 51 through the ink circulation pipe 58, to the head modules 26 in the ink-jet head 21.

The collector 53 collects ink left unconsumed by the ink-jet head 21 from the head modules 26. The ink collected by the collector 53 flows into the negative-pressure tank 54 through the ink circulation pipe 59.

The negative-pressure tank 54 stores the ink left unconsumed by the ink-jet head 21 after receiving the ink from the collector 53. The negative-pressure tank 54 also stores ink supplied from an ink cartridge 76 in an ink supplier 6 to be described later. Inside the negative-pressure tank 54, an air layer 66 is formed on the ink surface. The negative-pressure tank 54 communicated with a negative-pressure common air chamber 88 to be described later through a negative pressure-side communicating pipe 89 to be described later. The negative-pressure tank 54 is arranged at the same height as the positive-pressure tank 51.

The negative-pressure tank 54 is provided with a negative-pressure tank ink level sensor 67. The negative-pressure tank ink level sensor 67 is configured to detect whether or not the ink level in the negative-pressure tank 54 has reached a reference level. The negative-pressure tank ink level sensor 67 outputs a signal indicating "on" when the ink level in the negative-pressure tank 54 is not less than the reference level, and outputs a signal indicating "off" when the ink level is less than the reference level.

The ink pump 55 sends ink to the positive-pressure tank 51 from the negative-pressure tank 54. The ink pump 55 is provided in the ink circulation pipe 60.

The ink temperature regulator 56 regulates the temperature of the ink in the ink circulator 5. The ink temperature regulator 56 is provided in the ink circulation pipe 58. The ink temperature regulator 56 includes a heater 71, a heater temperature sensor 72, a heat sink 73 and an ink cooling fan (ink cooler) 74.

The heater 71 heats the ink passing inside the ink circulation pipe 58. The heater temperature sensor 72 measures the temperature of the heater 71. The heat sink 73 receives and releases heat from the ink passing inside the ink circulation pipe 58. The ink cooling fan 74 sends air to the heat sink 73 to cool the ink passing inside the ink circulation pipe 58.

The ink temperature sensor 57 measures the temperature of the ink in the ink circulator 5. The ink temperature sensor 57 is provided in the ink circulation pipe 58.

The ink circulation pipe 58 connects the positive-pressure tank 51 to the ink distributor 52. A part of the ink circulation pipe 58 is divided into a portion passing through the heater 71 and a portion passing through the heat sink 73. In the ink circulation pipe 58, the ink flows toward the ink distributor 52 from the positive-pressure tank 51. The ink circulation pipe 59 connects the collector 53 to the negative-pressure tank 54. In the ink circulation pipe 59, the ink flows toward the negative-pressure tank 54 from the collector 53. The ink circulation pipe 60 connects the negative-pressure tank 54 to the positive-pressure tank 51. In the ink circulation pipe 60, the ink flows toward the positive-pressure tank 51 from the negative-pressure tank 54.

The ink suppliers 6A and 6B supply ink to the ink circulators 5A and 5B, respectively. The ink supplier 6 includes the ink cartridge 76, an ink supply valve 77 and an ink supply pipe 78.

The ink cartridge 76 houses ink to be used for printing by the ink-jet head 21. The ink in the ink cartridge 76 is supplied to the negative-pressure tank 54 in the ink circulator 5 through the ink supply pipe 78.

The ink supply valve 77 opens and closes an ink flow path inside the ink supply pipe 78. The ink supply valve 77 is opened to supply the ink to the negative-pressure tank 54.

The ink supply pipe 78 connects the ink cartridge 76 to the negative-pressure tank 54. In the ink supply pipe 78, the ink flows toward the negative-pressure tank 54 from the ink cartridge 76.

The pressure generator 7 generates pressures for ink circulation in the positive-pressure tank 51 and the negative-pressure tank 54 in the ink circulator 5. The pressure generator 7 is shared by the ink circulators 5A and 5B. The pressure generator 7 includes the positive-pressure common air chamber 81, two positive pressure-side communicating pipes 82, a positive pressure-side atmospheric air open valve 83, a positive pressure-side atmospheric air open pipe 84, a positive pressure-side pressure regulating valve 85, a positive pressure-side pressure regulating pipe 86, a positive pressure-side pressure sensor 87, the negative-pressure common air chamber 88, two negative pressure-side communicating pipes 89, a negative pressure-side atmospheric air open valve 90, a negative pressure-side atmospheric air open pipe 91, a negative pressure-side pressure regulating valve 92, a negative pressure-side pressure regulating pipe 93, a negative pressure-side pressure sensor 94, an air pump 95, an air pump pipe 96, a junction pipe 97, an air filter 98 and an overflow pan 99.

The positive-pressure common air chamber 81 is an air chamber configured to equalize the pressures in the positive-pressure tank 51 in the ink circulator 5A and the positive-pressure tank 51 in the ink circulator 5B. The positive-pressure common air chamber 81 is communicated with air layers 61 in the positive-pressure tanks 51 in the two ink circulators 5A and 5B through the two positive pressure-side communicating pipes 82. Thus, the positive-pressure tanks 51 in the ink circulators 5A and 5B are communicated with each other through the positive-pressure common air chamber 81 and the positive pressure-side communicating pipes 82.

The positive pressure-side communicating pipes 82 communicate the positive-pressure common air chamber 81 with the air layers 61 in the positive-pressure tanks 51. The two positive pressure-side communicating pipes 82 are provided to correspond one by one to the two ink circulators 5A and 5B. Each of the positive pressure-side communicating pipes 82 has one end connected to the positive-pressure common air chamber 81 and the other end connected to the air layer 61 in the positive-pressure tank 51.

The positive pressure-side atmospheric air open valve 83 opens and closes an airflow path inside the positive pressure-side atmospheric air open pipe 84 to switch the positive-pressure tank 51 between a sealed state (a state of being cut off from the atmosphere) and an atmospheric air open state (a state of being communicated with the atmosphere) through the positive-pressure common air chamber 81 and the positive pressure-side communicating pipe 82. The positive pressure-side atmospheric air open valve 83 is provided on the positive pressure-side atmospheric air open pipe 84.

The positive pressure-side atmospheric air open pipe 84 forms an airflow path for releasing the inside of the pressurized tank to the atmosphere through the positive-pressure common air chamber 81 and the positive pressure-side communicating pipe 82. The positive pressure-side atmospheric air open pipe 84 has one end connected to the positive-pressure common air chamber 81 and the other end connected to the junction pipe 97.

The positive pressure-side pressure regulating valve 85 opens and closes an airflow path inside the positive pressure-side pressure regulating pipe 86 to regulate the pressures in the positive-pressure common air chamber 81 and the positive-pressure tank 51. The positive pressure-side pressure regulating valve 85 is provided on the positive pressure-side pressure regulating pipe 86.

The positive pressure-side pressure regulating pipe 86 forms an airflow path for regulating the pressures in the positive-pressure common air chamber 81 and the positive-pressure tank 51. The positive pressure-side pressure regulating pipe 86 has one end connected to the positive-pressure common air chamber 81 and the other end connected to the junction pipe 97.

The positive pressure-side pressure sensor 87 measures the pressure in the positive-pressure common air chamber 81. The pressure in the positive-pressure common air chamber 81 is equal to the pressures in the positive-pressure tanks 51 in the ink circulators 5A and 5B. This is because the positive-pressure common air chamber 81 is communicated with the air layers 61 in the positive-pressure tanks 51 in the ink circulators 5A and 5B.

The negative-pressure common air chamber 88 is an air chamber configured to equalize the pressures in the negative-pressure tank 54 in the ink circulator 5A and the negative-pressure tank 54 in the ink circulator 5B. The negative-pressure common air chamber 88 is communicated with air layers 66 in the negative-pressure tanks 54 in the two ink circulators 5A and 5B through the two positive pressure-side communicating pipes 89. Thus, the negative-pressure tanks 54 in the ink circulators 5A and 5B are communicated with each other through the negative-pressure common air chamber 88 and the negative pressure-side communicating pipes 89.

The negative pressure-side communicating pipes 89 communicate the negative-pressure common air chamber 88 with the air layers 66 in the negative-pressure tanks 54. The two negative pressure-side communicating pipes 89 are provided to correspond one by one to the two ink circulators 5A and 5B. Each of the negative pressure-side communicating pipes 89 has one end connected to the negative-pressure common air chamber 88 and the other end connected to the air layer 66 in the negative-pressure tank 54.

The negative pressure-side atmospheric air open valve 90 opens and closes an airflow path inside the negative pressure-side atmospheric air open pipe 91 to switch the negative-pressure tank 54 between the sealed state and the atmospheric air open state through the negative-pressure common air chamber 88 and the negative pressure-side communicating pipe 89. The negative pressure-side atmospheric air open valve 90 is provided on the negative pressure-side atmospheric air open pipe 91.

The negative pressure-side atmospheric air open pipe 91 forms an airflow path for releasing the negative pressure tank 54 to the atmosphere through the negative-pressure common air chamber 88 and the negative pressure-side communicating pipe 89. The negative pressure-side atmospheric air open pipe 91 has one end connected to the negative-pressure common air chamber 88 and the other end corrected to the junction pipe 97.

The negative pressure-side pressure regulating valve 92 opens and closes an airflow path inside the negative pressure-side pressure regulating pipe 93 to regulate the pressures in the negative-pressure common air chamber 88 and the negative-pressure tank 54. The negative pressure-side pressure regulating valve 92 is provided on the positive pressure-side pressure regulating pipe 93.

The negative pressure-side pressure regulating pipe 93 forms an airflow path for regulating the pressures in the negative-pressure common air chamber 88 and the negative-pressure tank 54. The negative pressure-side pressure regulating pipe 93 has one end connected to the negative-pressure common air chamber 88 and the other end connected to the junction pipe 97.

The negative pressure-side pressure sensor 94 measures the pressure in the negative-pressure common air chamber 88. The pressure in the negative-pressure common air chamber 88 is equal to the pressures in the negative-pressure tanks 54 in the ink circulators 5A and 5B. This is because the negative-pressure common air chamber 88 is communicated with the air layers 66 in the negative-pressure tanks 54 in the ink circulators 5A and 5B.

The air pump 95 suctions air from the negative-pressure tanks 54 in the ink circulators 5A and 5B through the negative-pressure common air chamber 88, and sends air to the positive-pressure tanks 51 in the ink circulators 5A and 5B through the positive-pressure common air chamber 81. The air pump 95 is provided in the air pump pipe 96.

The air pump pipe 96 forms an airflow path to be sent to the positive-pressure common air chamber 81 from the negative-pressure common air chamber 88 by the air pump 95. The air pump pipe 96 has one end connected to the positive-pressure common air chamber 81 and the other end connected to the negative-pressure common air chamber 88.

The junction pipe 97 has one end connected to the overflow pan 99 and the other end (upper end) communicated with the atmosphere through the air filter 98. The end of the junction pipe 97 on the overflow pan 99 side is closed by an overflow ball 100 to be described later during a normal operation. The positive pressure-side atmospheric air open pipe 84, the positive pressure-side pressure regulating pipe 86 the negative pressure-side atmospheric air open pipe 91 and the negative pressure-side pressure regulating pipe 93 are connected to the junction pipe 97. Thus, the positive pressure-side atmospheric air open pipe 84, the positive pressure-side pressure regulating pipe 86, the negative pressure-side atmospheric air open pipe 91 and the negative pressure-side pressure regulating pipe 93 are communicated with the atmosphere.

The air filter 98 prevents unwanted material and the like in the air from entering the junction pipe 97. The air filter 98 is provided at the upper end of the junction pipe 97.

The overflow pan 99 receives ink overflowing from the positive-pressure tank 51 and the negative-pressure tank 54 due to abnormality in the ink supply valve 77, for example, and also overflowing into the function pipe from the positive-pressure common air chamber 81 and the negative-pressure common air chamber 88.

The overflow pan 99 is provided with the overflow ball 100. The overflow ball 100 prevents external air from flowing into the junction pipe 97 by losing the end of the junction pipe 97 having an opening at the bottom of the overflow pan 99 when there is no ink in the overflow pan 99. When the ink flows into the overflow pan 99 from the junction pipe 97, the overflow ball 100 floats to enable the ink to flow into the overflow pan 99.

The overflow pan 99 is also provided with an overflow ink level sensor 101. The overflow ink level sensor 101 is configured to detect whether or not the ink level inside the overflow pan 99 has reached a predetermined level.

The overflow pan 99 is connected to a waste tank (not shown) and configured to discharge the ink to the waste tank when the ink surface is detected by the overflow ink level sensor 101.

The controller 8 controls operations of the respective units in the ink-jet printer 1. The controller 8 includes a CPU, a RAM, a ROM, a hard disk and the like.

To be more specific, the controller 8 performs control to print on the paper P by ejecting ink from the ink-jet head 21 while convey in the paper P the conveyer 2.

Also, during printing, the controller 8 controls the blower 41 and the suction unit 42 in the head cooler 4 to generate cooling air inside the head holder 22. In this event, the controller 8 controls a flow rate of air (flow rate of blow air) of the blower 41 and a flow rate of air (flow rate of suction air) of the suction unit 42 to suction air containing ink mist into the head holder 22 from a space between the bottom plate 31 of the head holder 22 and the conveyer belt 11 through the gaps 31b around the head modules 26.

Moreover, the controller 8 selectively uses a production priority mode (first mode) and an image priority mode (second mode) as print modes. The production priority mode is a print mode for printing without reducing print productivity by ensuring cooling performance of the ink-jet head 21. On the other hand, the image priority mode is a print mode that puts higher priority an print image quality compared with the production priority made. The print made is selected in advance and set by the user operating an operation panel (not shown), for example. The controller 8 controls the flow rate of blow air and the flow rate of suction air according to the print mode.

Next, operations of the ink-jet printer 1 are described.

Figure 7:
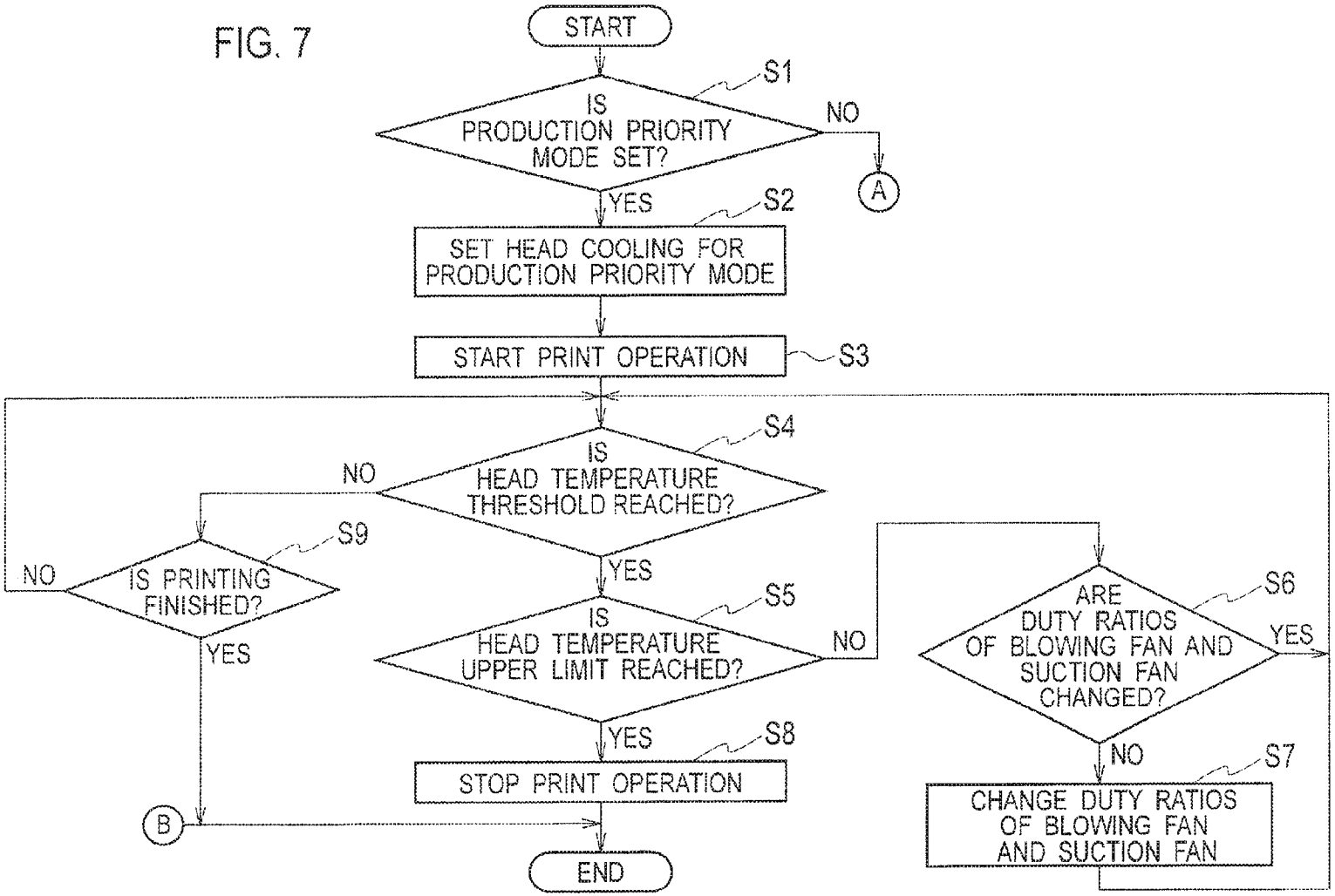
FIG. 7 is a flowchart showing operations of the ink-jet printer shown in FIG. 1.
Figure 8:
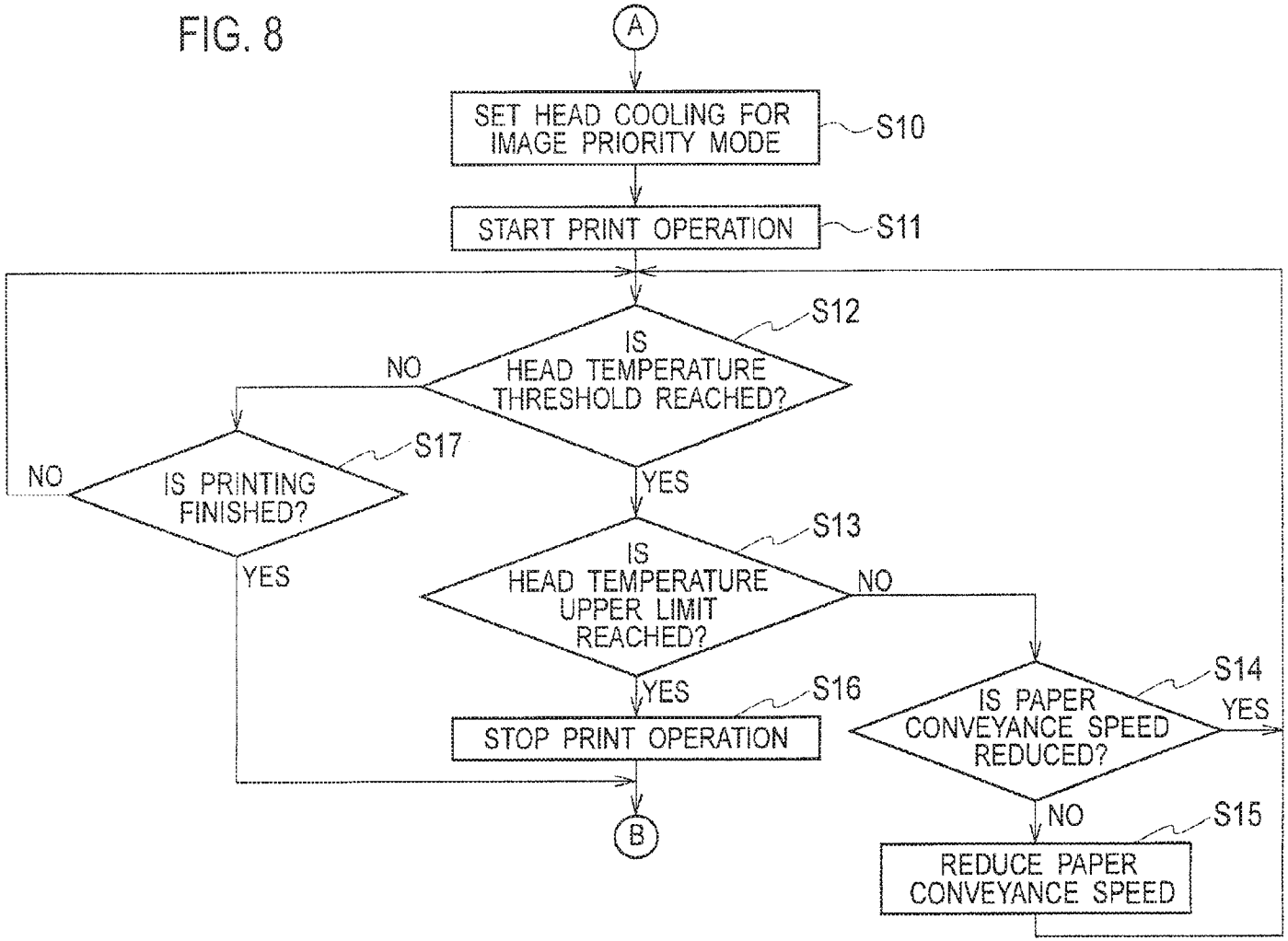
FIG. 8 is a flowchart showing operations of the ink-jet printer shown in FIG. 1.

FIGS. 7 and 8 are flowcharts showing the operations of the ink-jet printer 1. The processing shown in the flowcharts of FIGS. 7 and 8 is started when a print job is inputted to the ink-jet printer 1.

In Step S1 of FIG. 7, the controller 8 determines whether or not the print mode to be executed is the production priority mode.

After determining that the print mode to be executed is the production priority mode (Step S1: YES), the controller 8 make head cooling settings for the production priority mode. To be more specific, as duty ratios for driving the blowing fan 47 and the suction fan 49, the controller 8 sets a duty ratio Dsf of the blowing fan 47 and a duty ratio Dsk of the suction fan 49 for the production priority mode.

The duty ratios Dsf and Dsk are determined. In advance such that the flow rate of cooling air W (see FIGS. 9A and 9B) inside the head holder 22, which is determined based on the flow rate of blow air and the flow rate of suction air, is the flow rate of air required for cooling of the ink-jet head 21 according to a paper conveyance speed by the conveyer 2, and are stored in the controller 8. Here, as the paper conveyance speed becomes higher, the drive frequency of the head module 26 becomes higher and an amount of heat generated in the head module 26 is increased. Accordingly, the higher the paper conveyance speed, the larger the flow rate of the cooling air W required for cooling of the ink-jet head 21.

Moreover, the duty ratios Dsf and Dsk take values such that the flow rate of suction air is larger than the flow rate of blow air. When the flow rate of suction air is larger than the flow rate of blow air, a shortfall in the flow rate of blow air s covered by air from the space between the bottom plate 31 of the head holder 22 and the conveyer belt 11. More specifically, airflows F (see FIGS. 9A and 9B) are generated, which flow into the head holder 22 from the space between the bottom plate 31 and the conveyer belt 11 through the gaps 31b in the bottom plate 31. These airflows F collect ink mist together with the air into the head holder 22.

Assuming that a printing rate of print images is constant the higher the print productivity, the larger the amount of ink mist generated per unit time. Here, the print productivity is increased as the paper conveyance speed is increased. Accordingly, the higher the paper conveyance speed, the larger the amount of ink mist generated per unit time. Therefore, the duty ratios Dsf and Dsk are determined such that, in order to collect more ink mist, the amount of the airflow F flowing into the head holder through the gaps 31b is increased as the paper conveyance speed is increased. Here, the air volume of the airflows F flowing into the head holder 22 through the gaps 31b is determined by a difference between the flow rate of suction air and the flow rate of blow air.

Moreover, the duty ratios Dsf and Dsk are determined such that, as for the amount of the airflows F flowing into the head holder 22 through the gaps 31b, a landing shift amount due to the airflows F is within an allowable range. The landing shift amount is an amount of shift in landing position of the ink elected from the head module 26 on the paper P.

Following Step S2, the controller starts a print operation in Step S3. To be more specific, the controller 8 first closes the positive pressure-side atmospheric air open valve 83 and the negative pressure-side atmospheric air open valve 90.

Thus, the positive-pressure tanks 51 in the ink circulators 5A and 5B are set in the sealed state through the positive-pressure common air chamber 81 and the like, and the negative-pressure tanks 54 are set in the sealed state through the negative-pressure common air chamber 88 and the like. Note that, during standby when the ink-jet printer 1 does not operate, the positive pressure-side atmospheric air open valve 83 and the negative pressure-side atmospheric air open valve 90 are open and the positive pressure-side pressure regulating valve 85 and the negative pressure-side pressure regulating valve 92 are closed.

Next, the controller 8 starts the air pump 95. Thus, air is sent into the positive-pressure common air chamber 81 from the negative-pressure common air chamber 88, thereby reducing the pressures in the negative-pressure common air chamber 88 and the negative-pressure tank 54 and increasing the pressures in the positive-pressure common air chamber 81 and the positive-pressure tank 51. Thus, the ink flows toward the ink-jet head 21 from the positive-pressure tank 51.

When the pressure (positive pressure-side pressure) of the positive-pressure common air chamber 81 and the positive-pressure tank 51, which is measured by the positive pressure-side pressure sensor 87, and the pressure (negative pressure-side pressure) of the negative-pressure common air chamber 88 and the negative-pressure tank 54, which is measured by the negative pressure-side pressure sensor 94, reach set pressures Pk and Pf, respectively, the controller 8 stops the air pump 95. Here, the controller 8 controls opening and closing of the positive pressure-side pressure regulating valve 85 and the negative pressure-side pressure regulating valve 92 according to the measured values by the positive pressure-side pressure sensor 87 and the negative pressure-side pressure sensor 94, so that the positive pressure-side pressure and the negative pressure-side pressure are set to the set pressures Pk and Pf after the start of the air pump 95.

The set pressures Pk and Pf are set in advance as pressure values for setting the nozzle pressure of the head modules 26 at a proper value (negative pressure) while circulating the ink at a predetermined ink circulation flow rate in the ink circulators 5A and 5B.

When the positive pressure-side pressure and the negative pressure-side pressure reach the set pressures Pk and Pf, the controller 8 starts the drive roller 12 by the belt motor 16. Thus, circling drive of the conveyer belt 11 is started. The controller 8 controls the belt motor 16 such that the paper conveyance speed is set to a predetermined print conveyance speed.

The controller 8 also starts the paper adsorption fan 17. Thus, the paper adsorption fan 17 suctions air through the belt holes in the conveyer belt 11, thereby generating adsorption force in the belt holes.

Moreover, the controller 8 starts the blowing fan 47 and the suction fan 49. The controller 8 drives the blowing fan 47 and the suction fan 49 at the duty ratios Dsf and Dsk for the production priority mode set in Step S2, respectively.

By driving the blowing fan 47, air is blown into the head holder 22 through the blowing holes 46a in the blowing chamber 46 and the vent holes 32a in the side plate 32 of the head holder 22. Meanwhile, by driving the suction fan 49, air is suctioned from the head holder 22 through the vent holes 34a in the side plate 34 of the head holder 22 and the suction holes 48a in the suction chamber 48.

Figure 9A:
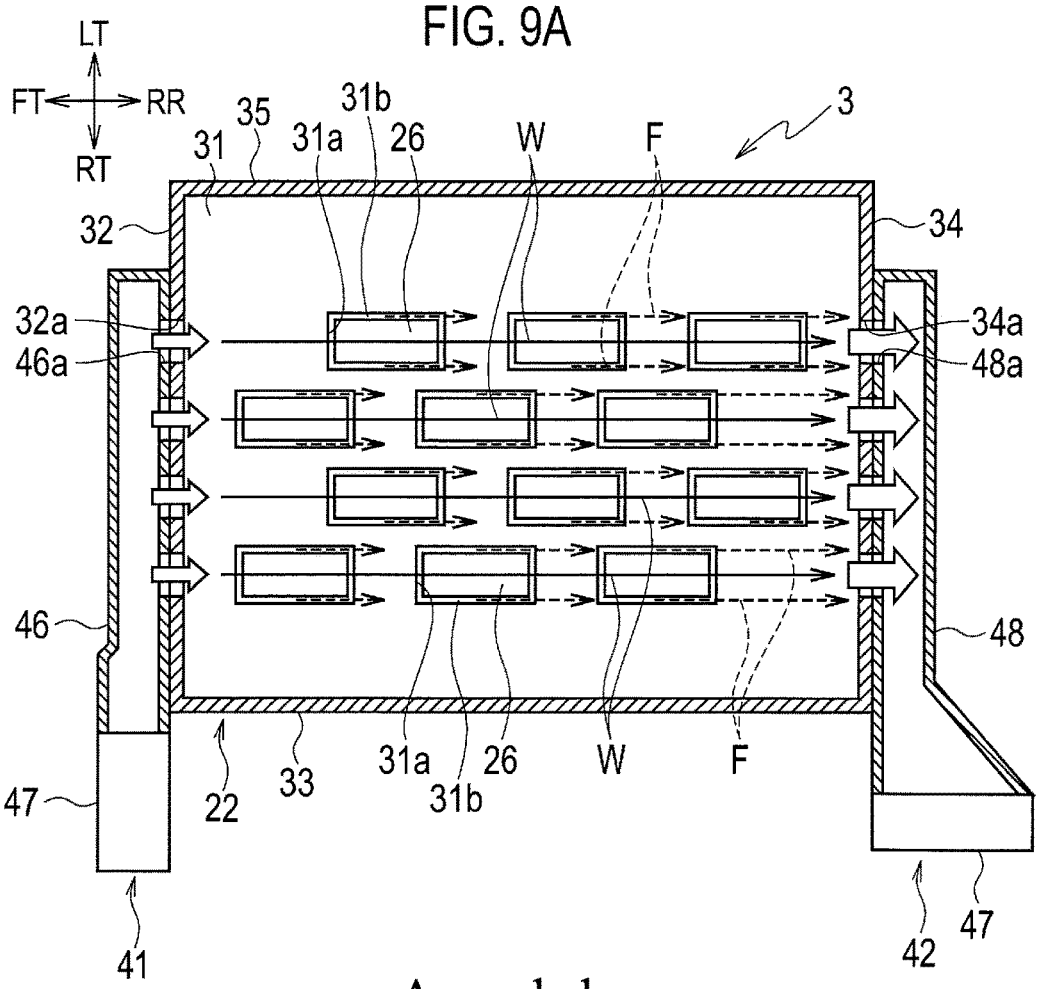
FIG. 9A is a diagram showing an airflow inside a head holder as seen from above.

Thus, as shown in FIGS. 9A and 9B, cooling air W is generated in the head holder 22, which flows from the front toward the rear. Also, airflows F are generated, which flow into the head holder 22 from the space between the bottom plate 31 and the conveyer belt 11 through the gaps 31b.

When the paper P is supplied to the conveyer 2 from an unillustrated paper feeder, the paper P is conveyed while being, adsorbed to and held by the conveyer belt 11. The controller 8 controls the head unit 3 to print an image by ejecting ink from the ink-jet heads 21A and 21B, based on the print job, onto the paper P conveyed below the head unit 3. When the specified number of sheets to he printed is more than one, the controller 8 performs control to print images by electing ink from the ink-jet heads 21A and 21B onto the sheets of the paper P, which are sequentially fed and conveyed on the conveyance belt 11.

During such a print operation, the controller 8 performs ink level maintenance control. The ink level maintenance control is control of the ink pump 55 and the ink supply valve 77 for circulating the ink while maintaining the ink levels in the positive-pressure tank 51 and the negative-pressure tank 54 at the reference level.

To be more specific, as shown in FIG. 10, the controller 8 turns off the ink pump 55 and closes the ink supply valve 77 in a state where the positive-pressure ink level sensor 62 and the negative-pressure tank ink level sensor 67 are both on. Likewise, the controller 8 turns off the ink pump 55 and closes the ink supply valve 77 in a state where the positive-pressure ink level sensor 62 is on and the negative-pressure tank ink level sensor 67 is off.

In a state where the positive-pressure ink level sensor 62 is off and the negative-pressure tank ink level sensor 67 is on, the controller 8 turns on the ink pump 55 and closes the ink supply valve 77.

In a state where the positive-pressure ink level sensor 62 and the negative-pressure tank ink level sensor 67 are both off, the controller 8 turns off the ink pump 55 and opens the ink supply valve 77.

During execution of the print job, the ink is supplied to the ink-jet head 21 from the positive-pressure tank 51, and the ink left unconsumed by the ink-jet head 21 is collected to the negative-pressure tank 54. When the positive-pressure ink level sensor 62 is turned off and the negative-pressure tank ink level sensor 67 is turned on, the ink pump 55 sends the ink to the positive-pressure tank 51 from the negative-pressure tank 54 under the ink level maintenance control. Thus, printing is performed while the ink is being circulated.

When the positive-pressure ink level sensor 62 and the negative-pressure tank ink level sensor 67 arc both turned off as the ink is consumed and the amount of ink circulated is reduced, the ink supply valve 77 is opened to supply the ink to the negative-pressure tank 54 under the ink level maintenance control.

Even with the ink level maintenance control as described above, minute changes in ink level occurs in the positive-pressure tank 51 and the negative-pressure tank 54. For example, the ink levels in the positive-pressure tank 51 and the negative-pressure tank 54 change due to outflow of the ink to the ink-jet head 21 from the positive-pressure tank 51 and return of the ink left unconsumed by the ink-jet head 21 to the negative-pressure tank 54. Also, ink supply from the ink cartridge 76 changes the ink level in the negative-pressure tank 54. Moreover, sending of the ink by the ink pump 55 changes the ink levels in the positive-pressure tank 51 and the negative-pressure tank 54.

The ink level changes in the positive-pressure tank 51 and the negative-pressure tank 54 cause changes in the positive pressure-side pressure and the negative pressure-side pressure. To cope with such changes, the controller 8 appropriately performs driving of the air pump 95 and opening and closing of the positive pressure-side pressure regulating valve 85 and the negative pressure-side pressure regulating valve 92 according to the measured values by the positive pressure-side pressure sensor 87 and the negative pressure-side pressure sensor 94 to maintain the set pressures Pk and Pf of the positive pressure-side pressure and the negative pressure-side pressure.

Incidentally, the ink has a printable temperature range. The printable temperature range is a temperature range within which normal ink ejection by the ink-jet head 21 can be ensured. When the ink temperature measured by the ink temperature sensor 57 is outside the printable temperature range at the start of the print operation, the controller 8 controls the ink temperature regulator 56 to regulate the ink temperature while circulating the ink by the ink circulator 5.

When the head modules 26 in the ink-jet head 21 are driven in the print operation, the head modules 26 generate heat. Although the head modules 26 are cooled by the cooling air W, the temperature of the head modules 26 may become higher than the ink temperature and the ink temperature may be increased. To counter this situation, the controller 8 starts the ink cooling fan 74 when the ink temperature measured by the ink temperature sensor 57 reaches an ink cooling start temperature Tk within the printable temperature range, to prevent the ink temperature from deviating from the printable temperature range. Thus, the ink temperature in the ink circulator 5 is lowered. When the ink temperature is lowered by a predetermined temperature from the ink cooling start temperature Tk, the controller 8 stops the ink cooling fan 74.

During the print operation, ink mist is generated by ink ejection by the head modules 26. Some of the ink mist is collected to the paper adsorption fan 17 through the belt holes in the conveyer belt 11. Also, part of the remaining ink mist is collected into the head holder 22 by the airflows F flowing into the head holder 22 through the gaps 31b in the bottom plate 31.

Referring back to FIG. 7, following Step S3, the controller 8 determines in Step S4 whether or not at least one of the ink-jet heads 21A and 21B has reached a head temperature threshold Th, based on the temperature measured by each head temperature sensor 27. Here, when the ink-jet head 21 includes a head module 26 in which the temperature measured by the head temperature sensor 27 has reached the head temperature threshold Th, the controller 8 determines that the ink-jet head 21 has reached the head temperature threshold Th.

The head temperature threshold Th is a threshold for determining whether or not cooling of the ink-jet head 21 is insufficient. The head temperature threshold Th is set to a temperature lower than a head temperature upper limit Tu. The head temperature upper limit Tu is an upper limit of a usable temperature range of the head modules 26.

After determining that at least one of the ink-jet heads 21A and 21B has reached the head temperature threshold Th (Step S4: YES), the controller 8 determines in Step S5 whether or not at least one of the ink-jet heads 21A and 21B has reached the head temperature upper limit Tu. Here, when the ink-jet head 21 includes a head module 26 in which the temperature measured by the head temperature sensor 27 has reached the head temperature upper limit Tu, the controller 8 determines that the ink-jet head 21 has reached the head temperature upper limit Tu.

After determining that neither of the ink-jet heads 21A and 21B has reached the head temperature upper limit Tu (Step S5: NO), the controller 8 determines in Step S6 whether or not the duty ratios of the blowing fan 47 and the suction fan 49 have been changed. After determining that the duty ratios of the blowing fan 47 and the suction fan 49 have been changed (Step S6: YES), the controller 8 returns to Step S4.

After determining that the duty ratios of the blowing fan 47 and the suction fan 49 are not changed (Step S6: NO), the controller 8 changes the duty ratios of the blowing fan 47 and the suction fan 49 in Step S7 to increase the flow rate of the cooling air W. For example, the controller 8 changes the duty ratios of the blowing fan 47 and the suction fan 49 to the maximum value (100%). Thereafter, the controller 8 returns to Step S4.

After determining in Step S5 that at least one of the ink-jet heads 21A and 21B has reached the head temperature upper limit Tu (Step S5: YES), the controller 8 stops the print operation in Step S8. To be more specific, the controller 8 stops the ink-jet heads 21A an 21B, the drive roller 12, the paper adsorption fan 17, the blowing fan 47 and the suction fan 49. The controller 8 opens the positive pressure-side atmospheric air open valve 83 and the negative pressure-side atmospheric air open valve 90. Thus, a series of operations are finished.

After determining in Step S4 that neither of the ink-jet heads 21A and 21B has reached the head temperature threshold Th (Step S4: NO), the controller 8 determines in Step S9 whether or not the printing is finished for the specified number of sheets to be printed. After determining that the printing, is not finished for the specified number of sheets to be printed. (Step S9: NO), the controller 8 returns to Step S4.

After determining that the printing is finished for the specified number of sheets to be printed (Step S9: YES), the controller 8 stops the drive roller 12, the paper adsorption fan 17, the blowing fan 47 and the suction fan 49, and opens the positive pressure-side atmospheric air open valve 83 and the negative pressure-side atmospheric air open valve 90 to finish the series of operations.

After determining in Step S1 that the print mode to be executed is the Image priority mode (Step S1: NO), the controller 8 make head cooling settings for the image priority mode in Step S10 of FIG. 8. To be more specific, as duty ratios for driving the blowing fan 47 and the suction fan 49, the controller 8 sets a duty ratio Dgf of the blowing fan 47 and a duty ratio Dgk of the suction fan 49 for the image priority mode.

The duty ratios Dgf and Dgk are determined in advance such that the flow rate of blow air and the flow rate of suction air are set to those that put higher priority on print image quality than on the cooling of the ink-jet head 21, and are stored in the controller 8.

To be more specific, the duty ratios Dgf and Dgk take such values that the flow rate of the cooling air W becomes smaller than that in the production priority mode. Thus, excessive cooling of the ink-jet head 21 can be suppressed. The excessive cooling of the ink-jet head 21 lowers the temperature of the ink in the head modules 26 and therefore increases the viscosity. Thus, the print image quality may be deteriorated by reduction in ink ejection amount and the like.

The duty ratios Dgf and Dgk take such values that the flow rate of suction air is larger than the flow rate of blow air. Moreover, the values of the duty ratios Dgf and Dgk are set such that the flow rate of the airflows F flowing into the head holder 22 through the gaps 31b in the bottom plate 31 is smaller than that in the production priority mode and enables suction of ink droplets (ink mist) of a predetermined size or less. Furthermore, the values of the duty ratios Dgf and Dgk are set such that the flow rate of the airflows F does not bend the flight trajectory of main droplets of ink elected from the head modules. Thus, ink landing shift due to the airflows F is reduced, while the ink mist is suctioned into the head holder 22 by the airflows F.

The controller 8 advances to Step S11 after Step S10. The processing in Steps S11 to S13 is the same as the processing in Steps S3 to S5 of FIG. 7 described above.

When a print opera is started in Step S11, cooling air W and airflows F shown in FIGS. 9A and 9B are also generated in the image priority mode. In the image priority mode, the flow rates of the cooling air W and the airflows F smaller than those in the production priority mode. The cooling air W is set to the flow rate that prevents excessive cooling of the in jet head 21. The airflows F are set to the flow rate that enables the ink mist to he suctioned into the head holder 2 while suppressing landing shift on the paper P.

After determining in Step S13 that neither of the ink-jet heads 21A and 21B has reached the head temperature upper limit Tu (Step S13: NO), the controller 8 determines in Step S14 whether or not the paper conveyance speed by the conveyer 2 has been reduced. After determining that the paper conveyance speed has been reduced (Step S14: YES), the controller 8 returns to Step S12.

After determining that the paper conveyance speed is not reduced (Step S14: NO), the controller 8 reduces the paper conveyance speed to a preset speed by controlling the belt motor 16 in Step S15. Thereafter, the controller 8 returns to Step S12.

After the paper conveyance speed is reduced, the controller 8 drives the head modules 26 at a drive frequency corresponding to the reduced paper conveyance speed. Thus, the amount of heat generated in the head modules 26 is reduced to suppress temperature rise.

After determining in Step S13 that at least one of the ink-jet heads 21A and 21B has reached the head temperature upper limit Tu (Step S13: YES), the controller 8 stops the print operation in Step S16. Thus, a series of operations are finished.

After determining in Step S12 that neither of the ink-jet heads 21A and 21B has reached the head temperature threshold Th (Step S12: NO), the controller 8 determines in Step S17 whether or not the printing is finished for the specified number of sheets to he printed. After determining that the printing is not finished for the specified number of sheets to be printed (Step S17: NO), the controller 8 returns to Step S12.

After determining that the printing is finished for the specified number of sheets to be primed (Step S17: YES), the controller 8 stops the drive roller 12, the paper adsorption fan 17, the blowing fan 47 and the suction fan 49, and opens the positive pressure-side atmospheric air open valve 83 and the negative pressure-side atmospheric air open valve 90 to finish the series of operations.

In the ink-jet primer 1, as described above, the controller 8 controls the flow rate of blow air and the flow rate of suction air to suction air containing ink mist into the head holder 22 from the space between the bottom plate 31 and the conveyer belt 11 through the gaps 31b in the bottom plate 31 of the head holder 22. Thus, the in mist can be collected into the head holder 22. As a result, contamination inside the printer and deterioration in print image quality due to the ink mist can be reduced.

Moreover, in the ink-jet printer 1, the ink mist is collected into the head holder 22 by controlling the flow rate of blow air and the flow rate of suction air of the head cooler 4. This eliminates the need to add a dedicated mechanism to collect the ink mist, thus suppressing an increase in size of the printer.

Therefore, the ink-jet printer 1 can reduce the contamination inside the printer and deterioration in print image quality due to the ink mist while suppressing an increase in size of the printer.

Moreover, in the ink-jet printer 1, the controller 8 controls the flow rate of blow air and the flow rate of suction air in the production priority mode such that the cooling air W has an air volume required for cooling or the ink-jet head 21 corresponding to the paper conveyance speed. Thus, in the production priority mode, printing can be performed without reducing the print productivity by ensuring cooling performance of the ink-jet head 21.

Meanwhile, in the image priority mode, the controller 8 controls the flow rate of blow air and the flow rate of suction air such that the cooling air W has an air volume which is smaller than that in the production priority mode, and makes the flow rate of airflows F flowing into the head holder 22 through the gaps 31b in the bottom plate 31 smaller than that in the production priority mode, so that the ink mist can be suctioned. Thus, excessive cooling of the ink-jet head 21 is reduced in the image priority mode compared with the production priority mode. At the same time, the ink mist can be collected into the head holder 22 while reducing the ink landing shift. As a result, better print image quality can he obtained in the image priority mode compared with the production priority mode.

The controller 8 selectively uses the production priority mode and the image priority mode as described above. Thus, convenience is improved since the printer can deal with the case where the user puts priority on the print productivity and the case where the user puts priority on the print image quality.

Moreover, the controller 8 reduces the paper conveyance speed when the temperature of the ink-jet head 21 reaches the head temperature threshold Th in the image priority mode. Thus, the amount of heat generated in the head modules 26 in the ink-jet head 21 is reduced to suppress temperature rise. As a result, damage to the ink-jet head 21 can be reduced.

Note that, in the image priority mode, the flow rate of blow air may be set to 0 (zero). In this case, the controller 8 drives the suction fan 49 only without driving the blowing fan 47 in the head cooler 4 during the print operation.

In this case, the cooling air N shown in FIGS. 9A and 9B is not generated but the airflows F are generated. The controller 8 drives the suction fan 49 at the duty ratios such that the flow rate of the airflows F enables suction of ink droplets (ink mist) of a predetermined size or less without suctioning main droplets of ink ejected from the had modules. Thus, the ink mist can be collected into the head holder 22 while reducing the ink landing shift.

Note that, although the cooling air W is not generated, a cooling effect of the airflows F on the ink-jet head 21 can be obtained.

Moreover, in the production priority mode, the flow rate of blow air and the flow rate of suction air may be set equal. In this case, a s generated by the blowing fan 62 and the suction fan 67 cancel out inside the head holder 22. Thus, the airflows F flowing into the head holder 22 through the gaps 31b in the bottom plate 31 are not generated. Thus, although the ink mist cannot be collected into the head holder 22, ink landing shift due to the airflows F can be suppressed.

Second Embodiment

Next, description is given of a second embodiment in which changes are made to the operation of the image priority mode in the first embodiment described above. Note that an inkjet printer of the second embodiment has the same structure as that of the ink-jet printer 1 of the first embodiment. Also, operations in a production priority mode according to the second embodiment are the same as those in the first embodiment, i.e., the operations in Steps S2 to S9 of FIG. 7.

Figure 11:
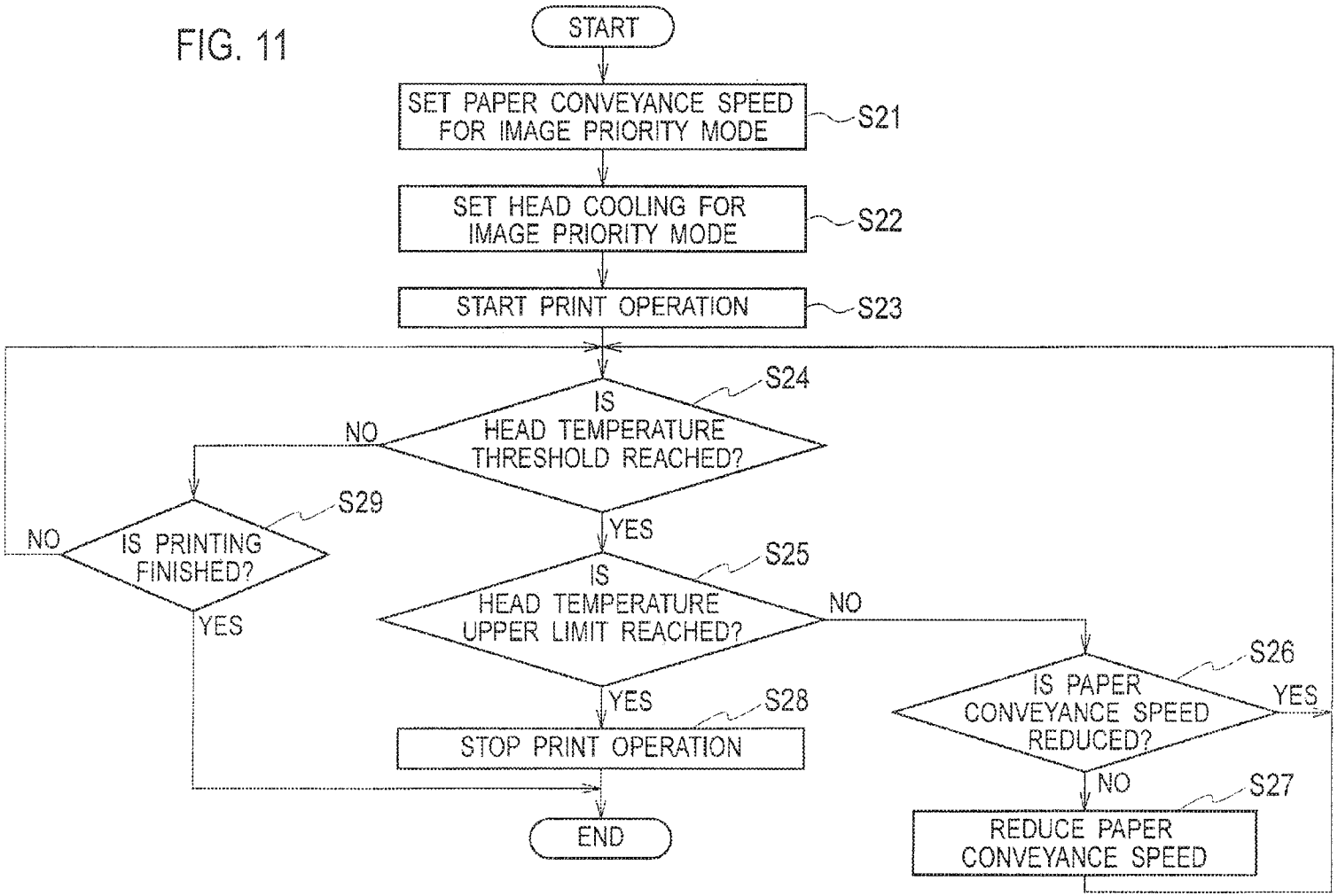
FIG. 11 is a flowchart showing operations of an image priority mode in a second embodiment.

FIG. 11 is a flowchart showing operations in an image priority mode in the second embodiment.

In Step S21 of FIG. 11, the controller 8 sets a paper conveyance seed for the image priority mode. To be more specific, the controller 8 sets a paper conveyance speed Vg for the image priority mode as a paper conveyance speed by the conveyer 2 during a print operation in the image priority mode. The paper conveyance speed Vg for the image priority mode is determined in advance to be lower than that in the production priority mode, and is stored in the controller 8.

Next, in Step S22, the controller 8 makes head cooling settings for the image priority mode. To be more specific, as duty ratios for driving the blowing fan 47 and the suction fan 49, the controller 8 sets a duty ratio Dgf of the blowing fan 47 and a duty ratio Dgk of the suction fan 49 for the image priority mode.

As in the case of the first embodiment, the duty ratios Dgf and Dgk take such values that the flow rate of the cooling air W becomes smaller than that in the production priority mode. Moreover, as in the case of the first embodiment, the values of the duty ratios Dgf and Dgk are set such that the flow rate of the airflows F flowing into the head holder 22 through the gaps 31b in the bottom plate 31 is smaller than that in the production priority mode and enables suction of ink droplets (ink mist) of a predetermined size or less. Furthermore, the values of the duty ratios Dgf and Dgk are set such that the flow rate of the airflows F does not bend the flight trajectory of main droplets of ink ejected from the head modules. The duty ratios Dgf and Dgk are determined in advance and stored in the controller 8.

Here, in the image priority mode of the second embodiment, since the paper conveyance speed Vg is lower than that in the production priority mode, the amount of ink mist generated per unit time is reduced. Thus, in the image priority mode of the second embodiment, the values of the duty ratios Def and Dgk can he set such that a difference between the flow rate of blow air and the flow rate of suction air is reduced and the flow rate of the airflows F is reduced compared with the first embodiment.

The controller 8 advances to Step S23 after Step S22. The processing in Steps S23 to S29 is the same as the processing in Steps S11 to S17 of FIG. 8 described above.

As described above, in the second embodiment, the paper conveyance speed Vg for the image priority mode is set lower than that in the production priority mode. Thus, the drive frequency of the head modules 26 is reduced in the image priority mode compared with the production mode. The amount of heat generated in the head modules 26 is therefore reduced to suppress temperature rise. As a result, damage to the ink-jet head 21 can be reduced.

Third Embodiment

Next, description is given of a third embodiment in which changes are made to the image priority mode in the first embodiment described above. Note that an ink-jet printer of the third embodiment has the same structure as that of the ink-jet printer 1 of the first embodiment. Also, operations in the production priority mode according to the second embodiment are the same as those in the first embodiment, i.e., the operations in Steps S2 to S9 of FIG. 7.

Figure 12:
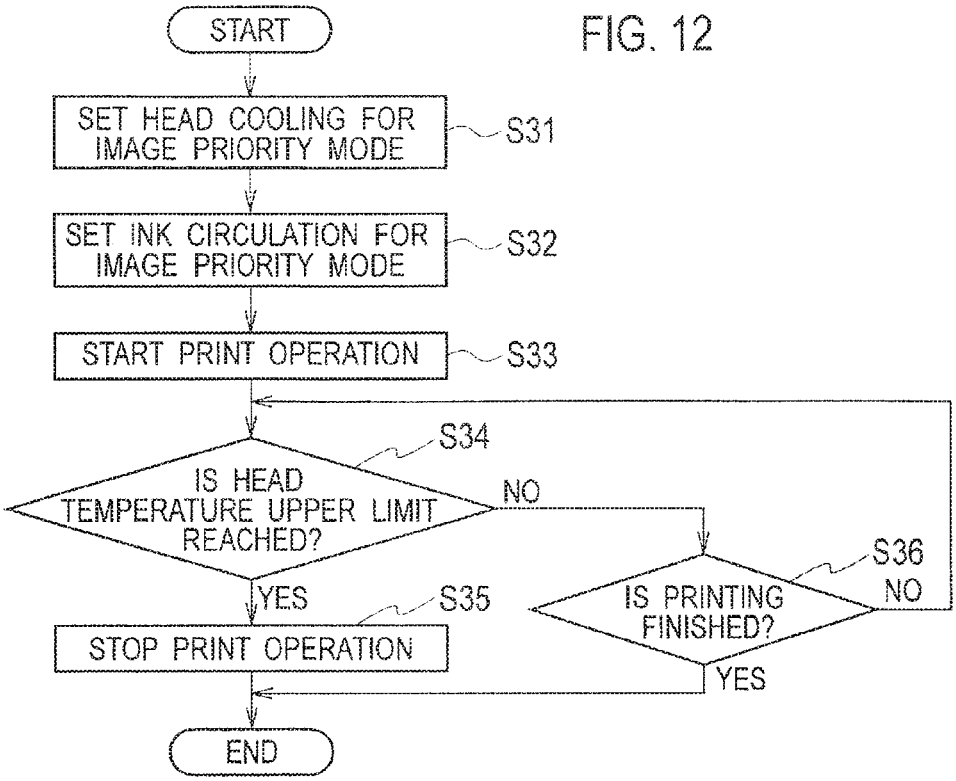
FIG. 12 is a flowchart showing operations of an image priority mode in a third embodiment.

FIG. 12 is a flowchart showing operations in an image priority mode in the third embodiment.

The processing in Step S31 of FIG. 12 is the same as that in Step S10 of FIG. 8 described above.

Following Step S31, the controller 8 makes ink circulation settings for the image priority mode in Step S32. To be more specific, as set pressures by the pressure generator 7, the controller 8 sets a set pressure Pkg of a positive pressure-side pressure and a set pressure Pfg of a negative pressure-side pressure for the image priority mode. The controller 8 also sets a duty ratio Dig of the ink pump 55 for the image priority mode, as a duty ratio for driving the ink pump 55.

The set pressures Pkg and Pfg and the duty ratio Dig are set in advance as values that set an ink circulation flow rate in the ink circulator 5 in the image priority mode to be higher than that in the production priority mode, and are stored in the controller 8.

To be more specific, the set pressure Pkg of the positive pressure-side pressure for the image priority mode is larger than the set pressure Pk of the positive pressure-side pressure in the production priority mode. Meanwhile, the set pressure Pfg of the negative pressure-side pressure for the image priority mode has an absolute value larger than that of the set pressure Pf of the negative pressure-side pressure in the production priority mode. The duty ratio Dig of the ink pump 55 for the image priority mode is larger than that of the ink pump 55 in the production priority mode.

Next, the controller 8 starts a print operation in Step S33. During the print operation, the controller 8 controls the pressure generator 7 such that the positive pressure-side pressure and the negative pressure-side pressure are set to the set pressures Pkg and Pfg, respectively. Moreover, the controller 8 drives the ink pump 55 at the duty ratio Dig under ink level maintenance control. Thus, the ink circulator 5 circulates ink at the ink circulation flow rate larger than that in the production priority mode.

The controller 8 advances to Step S34 after the print operation is started in Step S33. The processing in Steps S34 and S35 is the same as the processing in Steps S5 and S8 of FIG. 7 described above.

After determining in Step S34 that neither of the ink-jet heads 21A and 21B has reached the head temperature upper limit Tu (Step S34: NO), the controller 8 determines in Step S36 whether or not the printing is finished for the specified number of sheets to be printed. After determining that the printing is not finished for the specified number of sheets to be printed (Step S36: NO), the controller 8 returns to Step S34.

After determining that the printing is finished for the specified number of sheets to be printed (Step S36: YES), the controller 8 stops the drive roller 12, the paper adsorption fan 17, the blowing fan 47 and the suction fan 49, and opens the positive pressure-side atmospheric air open valve 83 and the negative pressure-side atmospheric air open valve 90 to finish a series of operations.

As described above, in the third embodiment, the ink circulation flow rate in the ink circulator 5 in the image priority mode is set larger than that in the production priority mode. Thus, the ink flow rate in the head modules 26 per unit time is increased in the image priority mode compared with the production priority mode. Thus, heat transfer from the head modules 26 to the ink can be facilitated. Thus, even in the image priority mode having a smaller flow rate of the cooling air W than the production priority mode, an increase in temperature of the head modules 26 can be reduced without decreasing the print conveyance speed. Therefore, also in the image priority mode, damage to the ink-jet head 21 can be reduced without deteriorating the print productivity.

In the image priority mode of the third embodiment, an increase in ink circulation flow rate increases load on the air pump 95 and the ink pump 55. However, since such an increase is only in the image priority mode, reduction in product life can be suppressed.

Fourth Embodiment

Next, description is given of a fourth embodiment in which changes are made to the image priority mode in the first embodiment described above. Note that an ink-jet printer of the fourth embodiment has the same structure as that of the ink-jet printer 1 of the first embodiment. Also, operations in a production priority mode according to the fourth embodiment are the same as those in the first embodiment, i.e., the operations in Steps S2 to S9 of FIG. 7.

Figure 13:
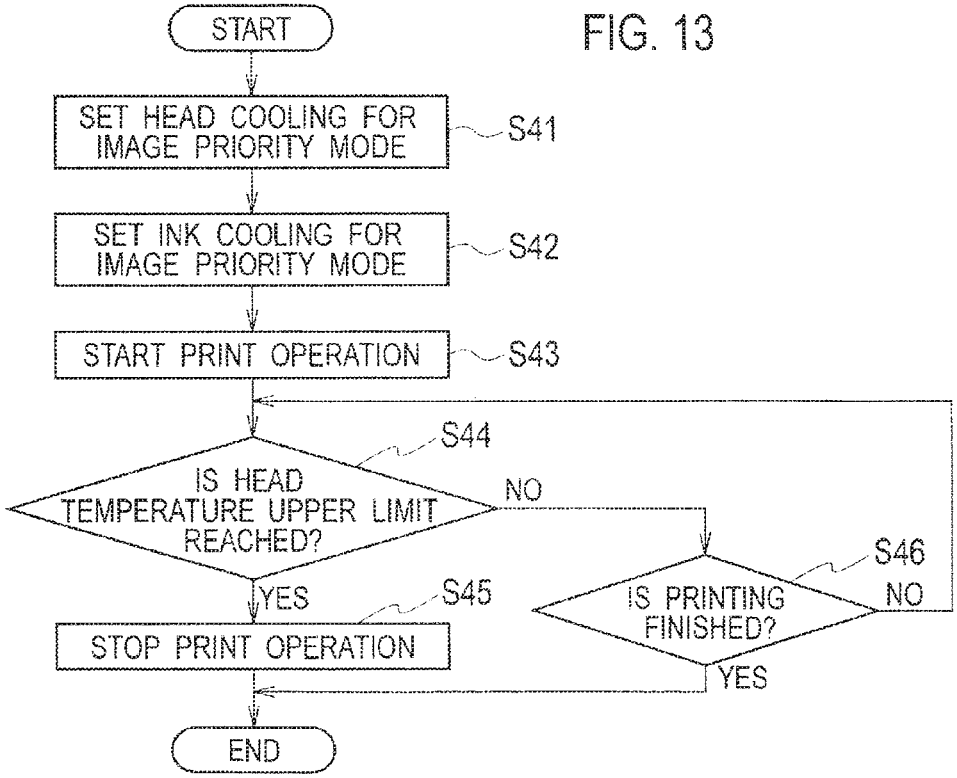
FIG. 13 is a flowchart showing operations of an image priority mode in a fourth embodiment.

FIG. 13 is a flowchart showing operations in an image priority mode in the fourth embodiment.

The processing in Step S41 of FIG. 13 is the same as that in Step S10 of FIG. 8 described above.

Following Step S41, the controller 8 makes ink cooling settings for the image priority mode in Step S42. To be more specific, the controller 8 sets an ink cooling start temperature Tkg for the image priority mode, as a temperature to start cooling of ink by the ink temperature regulator 56 during a print operation.

The ink cooling start temperature Tkg is lower than the ink cooling start temperature Tk in the production priority mode within the printable temperature range. The value of the ink cooling start temperature Tkg is determined in advance and stored in the controller 8.

Next, the controller 8 starts a print operation in Step S43. During the print operation, the controller 8 starts the ink cooling fan 74 when the ink temperature measured by the ink temperature sensor 57 reaches the ink cooling start temperature Tkg. Then, when the ink temperature is lowered by a predetermined temperature from the ink cooling start temperature Tkg, the controller 8 stops the ink cooling fan 74.

The controller 8 advances to Step S44 after the print operation is started in Step S43. The processing in Steps S44 to S46 is the same as that in Steps S34 to S36 of FIG. 12 described above.

As described above, in the fourth embodiment, the ink cooling start temperature Tkg for the image priority mode is set lower than the ink cooling start temperature Tk in the production priority mode. Thus, the temperature of the ink flowing into the head modules 26 can be suppressed low in the image priority mode compared with the production priority mode. Accordingly, heat exchange efficiency can be increased in the image priority mode by increasing a temperature difference between the head modules 26 and the ink, compared with the production priority mode. Thus, even in the image priority mode having a smaller flow rate of the cooling air W than the production priority mode, an increase in temperature of the head modules 26 can be reduced without decreasing the print conveyance speed. Therefore, also in the image priority mode, damage to the ink-jet head 21 can be reduced without deteriorating the print productivity.

Other Embodiments

As described above, the present invention has been described through the first to fourth embodiments. However, it should be understood that the present invention is not limited to the description and drawings which constitute a part of this disclosure. From this disclosure, various alternative embodiments, examples and operational techniques will become apparent to those skilled in the art.

In the first to fourth embodiments described above, the gaps 31b between the attachment openings 31a and the head modules 26 form the openings in the bottom plate 31 of the head holder 22. However, the openings may be formed at any other positions.

Moreover, in the first to fourth embodiments described above, the ink head 21 includes a number of the head modules 26. However, the ink-jet head may be a single elongated one.

Embodiments of the present invention have been described above. However the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not to those described in the embodiment of the present invention.

What is claimed is:

1. An ink-jet printer comprising:

a conveyer configured to convey a printing medium;

an ink-jet head configured to eject ink onto the printing medium conveyed by the conveyer;

a head holder in a box shape configured to hold the ink-jet head, the head holder having an opening through which a space between the head holder and the conveyer communicates with an inside of the head holder;

a head cooler including:

a blower configured to blow air into the head holder from an outside of the head holder toward the ink-jet head with a flow rate of blow air; and a suction unit configured to suction air from the head holder with a flow rate of suction air, the head cooler being configured to generate cooling air for cooling the ink-jet head inside the head holder by the blower and the suction unit such that the cooling air generated by the head cooler flows into the head holder in a flow direction parallel to a conveying [direction] *surface* of the conveyer; and a controller configured to drive the conveyer to convey the printing medium while driving the ink-jet head to eject the ink onto the printing medium to perform printing and driving the head cooler to generate the cooling air, wherein the controller is configured to control the flow rate of blow air and the flow rate of suction air such that air containing ink mist *generated by ink ejection by the ink-jet head* is suctioned into the head holder through the opening*, and*

*the flow direction is perpendicular to a conveying direction of the printing medium along the conveying surface.*

2. The ink-jet printer according to claim 1, wherein the controller selectively uses a first mode and a second mode, in the first mode, the controller controls the flow rate of blow air and the flow rate of suction air such that the cooling air in the head holder has an air volume required to cool the ink-jet head corresponding to a conveyance speed of the printing medium by the conveyer, and in the second mode, the controller controls the flow rate of blow air and the flow rate of suction air such that the cooling air in the head holder has an air volume that is smaller than the air volume of the cooling air in the head holder in the first mode and airflow flowing into the head holder through the opening has an air volume that is smaller than an air volume of airflow flowing into the head holder through the opening in the first mode and capable of suctioning the ink mist.

3. The ink-jet printer according to claim 2, wherein, in the second mode, the controller drives the conveyer to reduce the conveyance speed of the printing medium upon a temperature of the ink-jet head reaching a threshold.

4. The ink-jet printer according to claim 2, further comprising an ink circulator configured to supply the ink to the ink-jet head while circulating the ink, wherein the controller drives the ink circulator such that an ink circulation flow rate in the second mode is higher than an ink circulation flow rate in the first mode.

5. The ink-jet printer according to claim 2, further comprising an ink circulator configured to supply the ink to the ink-jet head while circulating the ink, wherein the ink circulator includes an ink cooler configured to cool the ink, in the first mode, the controller drives the ink cooler to start cooling of the ink upon an ink temperature of the ink being a first temperature, and in the second mode, the controller drives the ink cooler to start cooling of the ink upon an ink temperature of the ink being a second temperature lower than the first temperature.

6. The ink-jet printer according to claim 1, wherein the ink-jet head comprises a plurality of head modules each configured to eject the ink, and the head holder has a hollow interior space for housing the plurality of head modules inside the head holder.

7. The ink-jet printer according to claim 1, wherein the opening of the head holder includes openings arranged along [the] *a* conveying direction *of the printing medium*.

8. The ink-jet printer according to claim 1, wherein the ink-jet head comprises a head module configured to eject the ink, the conveyer comprises a conveyer belt, the head holder comprises a bottom plate having the opening and a lower surface facing the conveyer belt, and the head module has an ink ejection surface arranged in between the conveyer belt and the lower surface.

9. An ink-jet printer comprising:

a conveyer configured to convey a printing medium;

an ink-jet head configured to eject ink onto the priming medium conveyed by the conveyer;

a head holder in a box shape configured to hold the ink-jet head, the head holder having an opening through which a space between the head holder and the conveyer communicates with an inside of the head holder;

a head cooler including:

a blower configured to blow air into the head holder from an outside of the head holder with a flow rate of blow air; and a suction unit configured to suction air from the head holder with a flow rate of suction air, the head cooler being configured to generate cooling air for cooling the ink-jet head inside the head holder by the blower and the suction unit; and a controller configured to drive the conveyer to convey the printing medium while driving the ink-jet head to eject the ink onto the printing medium to perform printing and driving the head cooler to generate the cooling air, wherein the controller is configured to control the flow rate of blow air and the flow rate of suction air such that air containing ink mist is suctioned into the head holder through the opening, the controller selectively uses a first mode and a second mode, in the first mode, the controller controls the flow rate of blow air and the flow rate of suction air such that the cooling air in the head holder has an air volume required to cool the ink-jet head corresponding to a conveyance speed of the printing medium by the conveyer, and in the second mode, the controller controls the flow rate of blow air and the flow rate of suction air such that the cooling air in the head holder has an air volume that is smaller than the air volume of the cooling air in the head holder in the first mode and airflow flowing into the head holder through the opening has an air volume that is smaller than an air volume of airflow flowing into the head holder through the opening in the first mode and capable of suctioning the ink mist.

*10. The ink-jet printer according to claim 1, wherein*

*the suction unit is arranged to face the blower with the ink-jet head therebetween, and*

*the head cooler is configured to generate the cooling air such that the cooling air flows from the blower to the suction unit.*

*11. The ink-jet printer according to claim 1, wherein the controller is configured to control an air volume of airflow flowing into the head holder through the opening depending on a difference between the flow rate of blow air and the flow rate of suction air.*

*12. The ink-jet printer according to claim 1, further comprises a plurality of the ink-jet heads,*

*wherein the head holder holds the plurality of the ink-jet heads.*

*13. The ink-jet printer according to claim 1, wherein, during printing, the controller controls the flow rate of the blow air and the flow rate of the suction air such that the air containing the ink mist generated by the ink ejected by the ink-jet head is suctioned into the head holder through the opening.*

*14. An ink-jet printer comprising:*

*a conveyer configured to convey a printing medium;*

*an ink-jet head configured to eject ink onto the printing medium conveyed by the conveyer;*

*a head holder in a box shape configured to hold the ink-jet head, the head holder having an opening through which a space between the head holder and the conveyer communicates with an inside of the head holder;*

*a head cooler including:*

*a blower mounted to the head holder and configured to blow air into the head holder from an outside of the head holder toward the ink-jet head with a flow rate of blow air; and*

*a suction unit mounted to the head holder and configured to suction air from the head holder with a flow rate of suction air, the head cooler being configured to generate cooling air for cooling the ink-jet head inside the head holder by the blower and the suction unit such that the cooling air generated by the head cooler flows into the head holder in a flow direction parallel to a conveying surface of the conveyer; and*

*a controller configured to drive the conveyer to convey the printing medium while driving the ink-jet head to eject the ink onto the printing medium to perform printing and driving the head cooler to generate the cooling air, wherein*

*the controller is configured to control the flow rate of blow air and the flow rate of suction air such that air containing ink mist generated by ink ejection by the ink-jet head is suctioned into the head holder through the opening.*

*15. The inkjet printer according to claim 1, wherein*

*the head holder comprises:*

*a first sidewall with at least one first vent hole; and*

*a second sidewall with at least one second vent hole,*

*the first sidewall and the second sidewall face each other in the flow direction,*

*the blower comprises a blowing chamber with at least one blowing hole arranged at a position corresponding to*

*the at least one first vent hole, the blower being configured to blow the air into the head holder through the at least one blowing hole and the at least one first vent hole, and*

*the suction unit comprises a suction chamber with at least one suction hole arranged at a position corresponding to the at least one second vent hole, the suction unit being configured to suction the air from the head holder through the at least one second vent hole and the at least one suction hole.*

*16. The ink-jet printer according to claim 9, wherein*

*the blower is configured to blow the air toward the ink-jet head,*

*the suction unit is arranged to face the blower with the ink-jet head therebetween, and*

*the head cooler is configured to generate the cooling air such that the cooling air flows from the blower to the suction unit.*

*17. The ink-jet printer according to claim 9, wherein the controller is configured to control an air volume of airflow flowing into the head holder through the opening depending on a difference between the flow rate of blow air and the flow rate of suction air.*

*18. The ink-jet printer according to claim 9, further comprises a plurality of the ink-jet heads*

*wherein the head holder holds the plurality of the ink-jet heads.*

* * * * *